US011135506B2

(12) United States Patent
Collins

(10) Patent No.: US 11,135,506 B2
(45) Date of Patent: *Oct. 5, 2021

(54) APPARATUS AND METHOD FOR INSTALLING AND REMOVING PANELS

(71) Applicant: Barry Collins, Burnt Hills, NY (US)

(72) Inventor: Barry Collins, Burnt Hills, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 16/285,940

(22) Filed: Feb. 26, 2019

(65) Prior Publication Data

US 2019/0192957 A1 Jun. 27, 2019

Related U.S. Application Data

(63) Continuation of application No. 14/955,868, filed on Dec. 1, 2015, now Pat. No. 10,226,684.

(51) Int. Cl.

| A63C 19/12 | (2006.01) |
|---|---|
| B66F 9/075 | (2006.01) |
| B66F 9/18 | (2006.01) |
| B65G 47/91 | (2006.01) |
| B66F 7/22 | (2006.01) |
| B62B 3/10 | (2006.01) |
| B66F 7/06 | (2006.01) |
| B25J 15/06 | (2006.01) |
| B66F 19/00 | (2006.01) |
| B66C 1/02 | (2006.01) |
| B66C 23/20 | (2006.01) |

(52) U.S. Cl.
CPC .......... *A63C 19/12* (2013.01); *B66F 9/07554* (2013.01); *B66F 9/181* (2013.01); *B25J 15/0616* (2013.01); *B62B 3/108* (2013.01); *B65G 47/91* (2013.01); *B66C 1/0212* (2013.01); *B66C 23/208* (2013.01); *B66F 7/0625* (2013.01); *B66F 7/22* (2013.01); *B66F 19/00* (2013.01); *Y10T 29/53191* (2015.01); *Y10T 29/53961* (2015.01)

(58) Field of Classification Search
CPC ...... A63C 19/12; B66F 9/07554; B66F 9/181; B66C 23/208
See application file for complete search history.

(56) References Cited

U.S. PATENT DOCUMENTS

| 2,503,388 | A | 1/1948 | Hedlund |
|---|---|---|---|
| 3,765,550 | A | 10/1973 | Tausheck |
| 3,895,721 | A | 7/1975 | Russell |
| 3,923,167 | A | 12/1975 | Blankenbeckler |
| 4,050,671 | A | 9/1977 | Coleman |
| 4,810,151 | A | 3/1989 | Shem |
| 5,655,734 | A | 8/1997 | Dahl |
| 6,210,097 | B1 | 4/2001 | Kim |
| 7,780,389 | B1 | 8/2010 | Young |
| 10,226,684 | B2 * | 3/2019 | Collins ............... B66F 9/07554 |

* cited by examiner

*Primary Examiner* — Sarang Afzali
(74) *Attorney, Agent, or Firm* — Heslin Rothenberg Farley & Mesiti P.C.; Jacquelyn A. Graff, Esq.

(57) ABSTRACT

An apparatus for installing and removing glass panels and methods of using the apparatus are disclosed. The apparatus includes a base portion, a back support structure secured to the base portion, and a glass adjustment system moveably coupled to the back support structure. Methods for using the apparatus to install and remove glass panels from, for example, ice rink boards, are also disclosed.

20 Claims, 29 Drawing Sheets

APPARATUS AND METHOD FOR INSTALLING AND REMOVING PANELS

CROSS-REFERENCE TO RELATED APPLICATION

This application is a continuation of U.S. application Ser. No. 14/955,868 filed Dec. 1, 2015, now U.S. Pat. No. 10,226,684, which is incorporated herein by reference in its entirety.

FIELD OF THE INVENTION

The present invention relates generally to an apparatus for installing and/or removing glass panels. More specifically, but not exclusively, the present invention concerns an apparatus for installing and/or removing glass panels in an ice rink.

BACKGROUND OF THE INVENTION

When ice rink glass breaks it needs to be replaced before play can continue. The traditional methods for replacing the glass include multiple people working together on ladders to remove the old glass out of the U-shaped channel and insert a new piece of glass into the U-shaped channel. Alternatively, when available, a fork lift may be used with an attachment to couple to the glass and remove the broken piece of glass, then the fork lift may be coupled to the new piece of glass which may then be installed. Thus, a better method of removing and reinstalling ice rink glass is needed.

SUMMARY OF THE INVENTION

Aspects of the present invention provide an apparatus for installing and/or removing glass panels and methods of using the same.

In one aspect, provided herein is an apparatus, including a base portion, a back support structure secured to the base portion, and a glass adjustment system moveably coupled to the back support structure.

In another aspect, provided herein is method of installing a glass panel, including obtaining an apparatus. The apparatus including a base portion, a back support structure secured to the base portion, and a glass adjustment system moveably coupled to the back support structure. The method may also include positioning the apparatus adjacent to the glass panel for installation and coupling the glass adjustment system to the glass panel. The method may further include raising the glass panel into the air using the glass adjustment system and positioning the apparatus and attached glass panel for insertion into an ice rink board. Finally, the method may include inserting the glass panel into the ice rink board and removing the glass adjustment system from the glass panel.

In yet another aspect, provided herein is a method for removing a glass panel, including obtaining an apparatus. The apparatus including a base portion, a back support structure secured to the base portion, and a glass adjustment system moveably coupled to the back support structure. The method may also include positioning the apparatus adjacent to the glass panel for removal and coupling the glass adjustment system to the glass panel. The method may further include raising the glass panel out of an ice rink board using the glass adjustment system and moving the apparatus and attached glass panel away from the ice rink board. Finally, the method may include performing maintenance to at least one of the glass panel and the ice rink board and reinserting the glass panel into the ice rink board.

These, and other objects, features and advantages of this invention will become apparent from the following detailed description of the various aspects of the invention taken in conjunction with the accompanying drawings.

BRIEF DESCRIPTION OF DRAWINGS

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention. It is emphasized that, in accordance with the standard practice in the industry, various features are not drawn to scale. In fact, the dimensions of the various features may be arbitrarily increased or reduced for clarity of discussion. The foregoing and other objects, features and advantages of the invention are apparent from the following detailed description taken in conjunction with the accompanying drawings in which.

DETAILED DESCRIPTION FOR CARRYING OUT THE INVENTION

Figure 1:
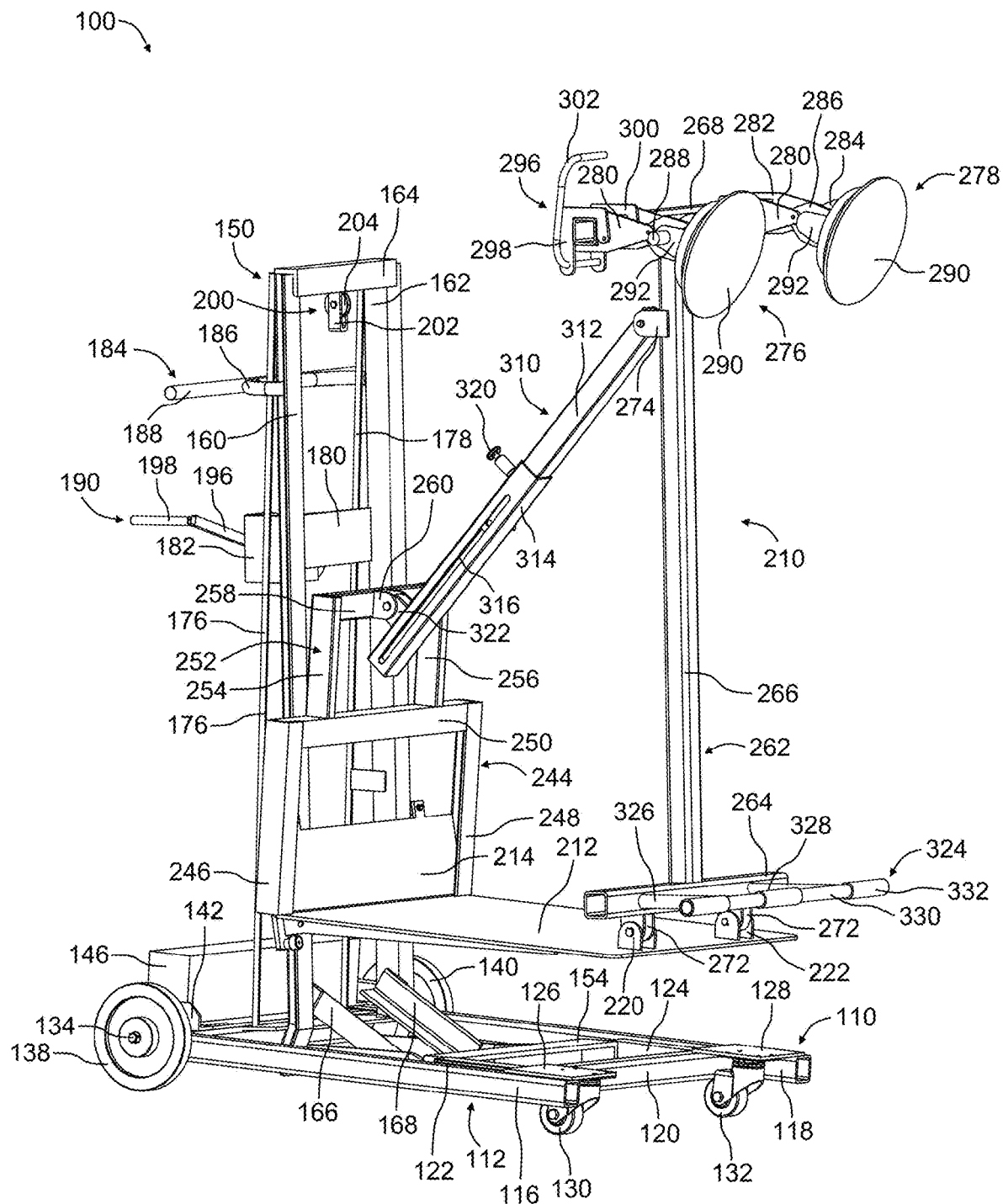
FIG. 1 is a side perspective view of a panel installation apparatus, in accordance with an aspect of the present invention.

Generally stated, disclosed herein is an apparatus for installing and/or removing glass panels. Further, methods using the apparatus for installing and/or removing the glass panels are discussed.

Referring to the drawings, wherein like reference numerals are used to indicate like or analogous components throughout the several views, and with particular reference to FIGS. 1-13, there is illustrated an exemplary embodiment of an apparatus 100 for installing and/or removing glass panels. The glass panels may be, for example, rink glass panels. Although the term "glass panels" is used throughout the specification it is also contemplated that the apparatus 100 may be used for removal of panels made of other materials which are heavy, breakable, and/or within channels that require lifting above the channels for removal. The apparatus 100 may include a base portion 110, a back support structure 150, and a glass adjustment system 210. The back support structure 150 may be secured to the base portion 110 and the glass adjustment system 210 may be moveably secured to the back support structure 150.

Figure 23:
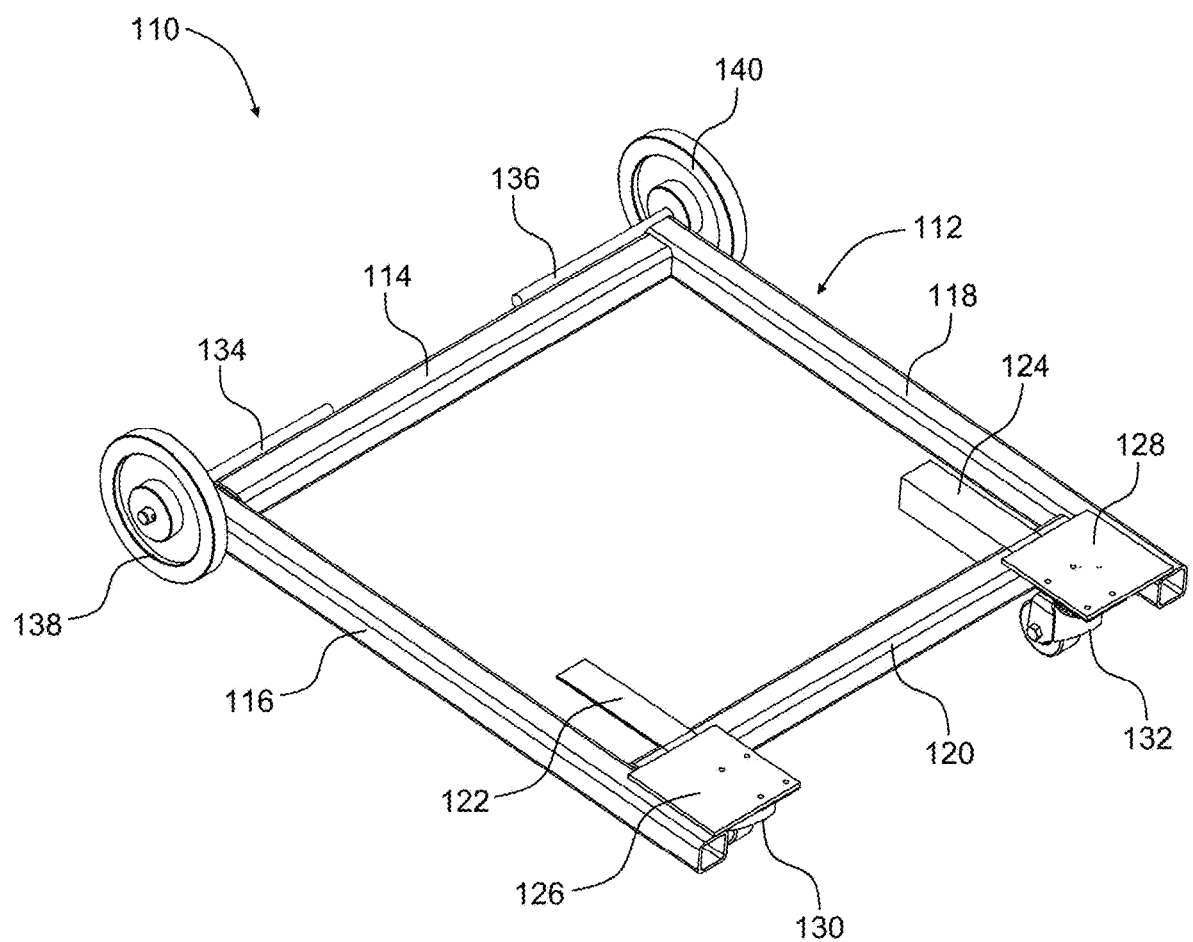
FIG. 23 is a top perspective view of a portion of a base of the apparatus of FIG. 1, in accordance with an aspect of the present invention.
Figure 24:
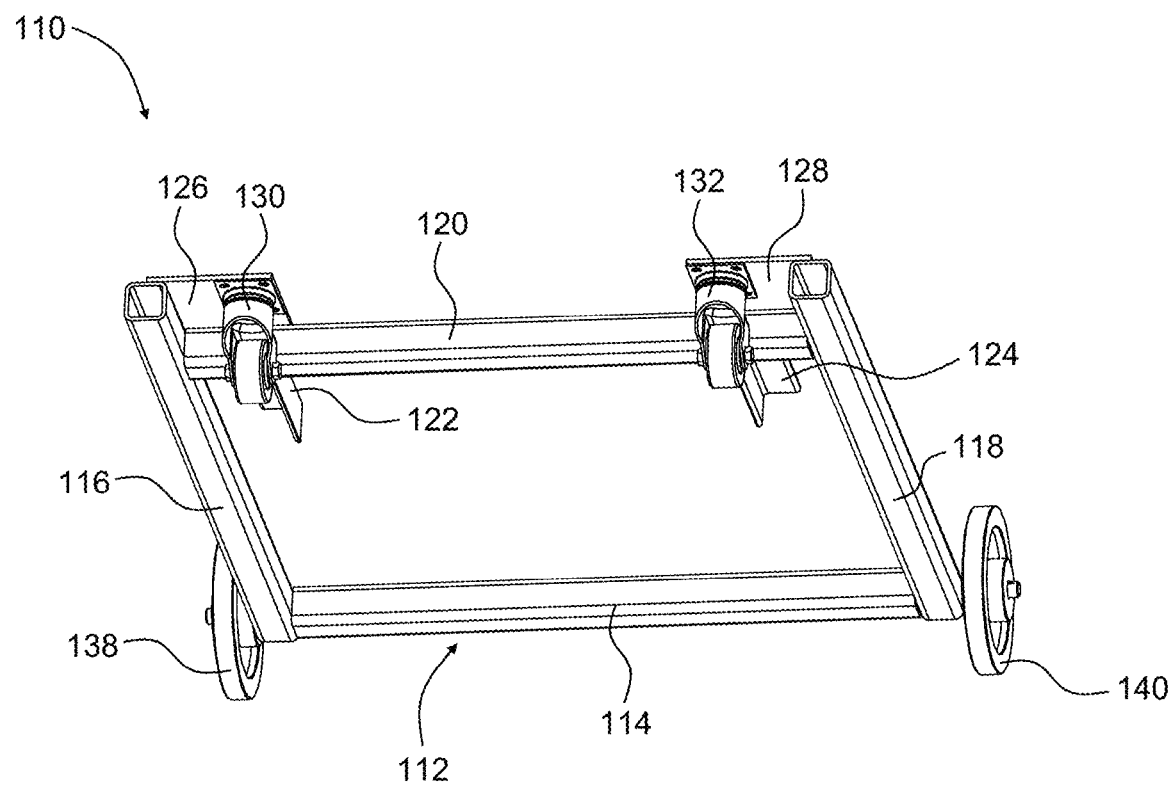
FIG. 24 is a bottom perspective view of the portion of the base of FIG. 23, in accordance with an aspect of the present invention.
Figure 25:
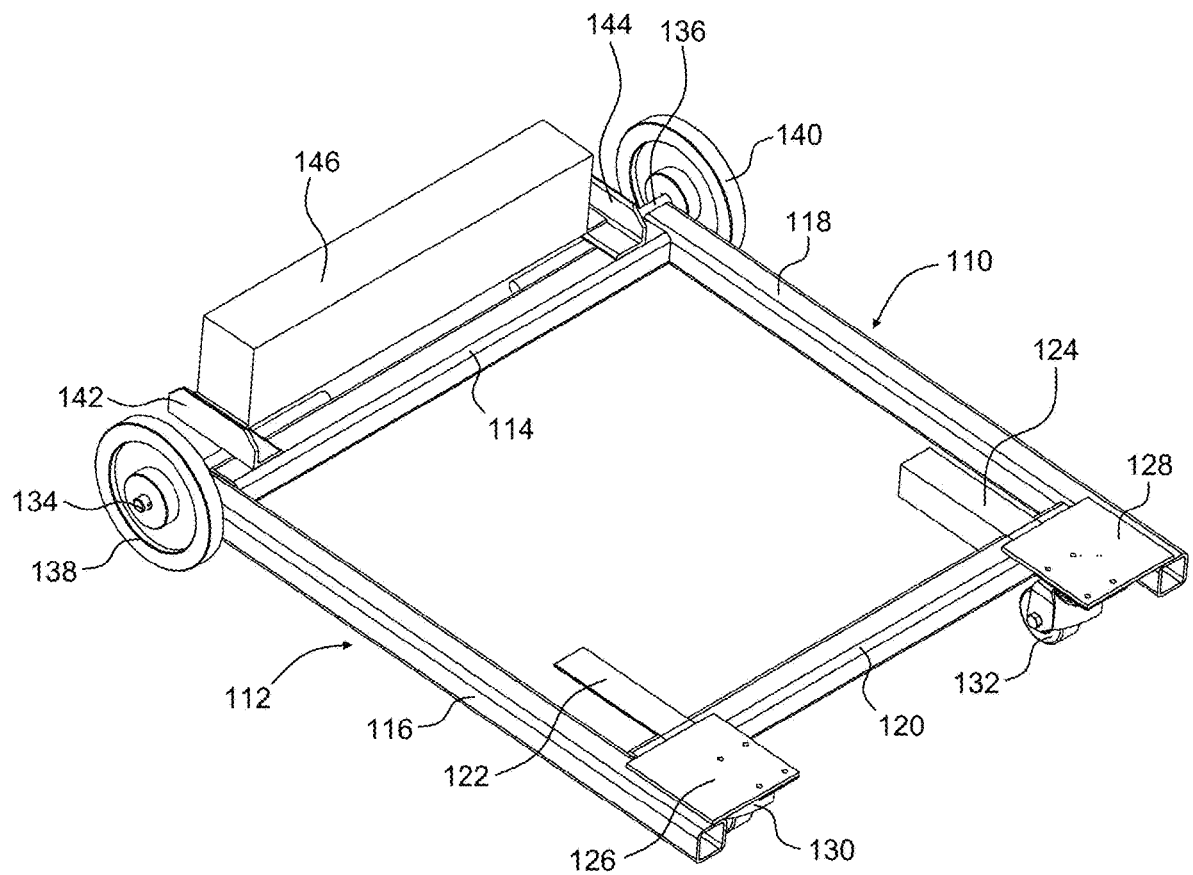
FIG. 25 is a top perspective view of the base of the apparatus of FIG. 1, in accordance with an aspect of the present invention.
Figure 26:
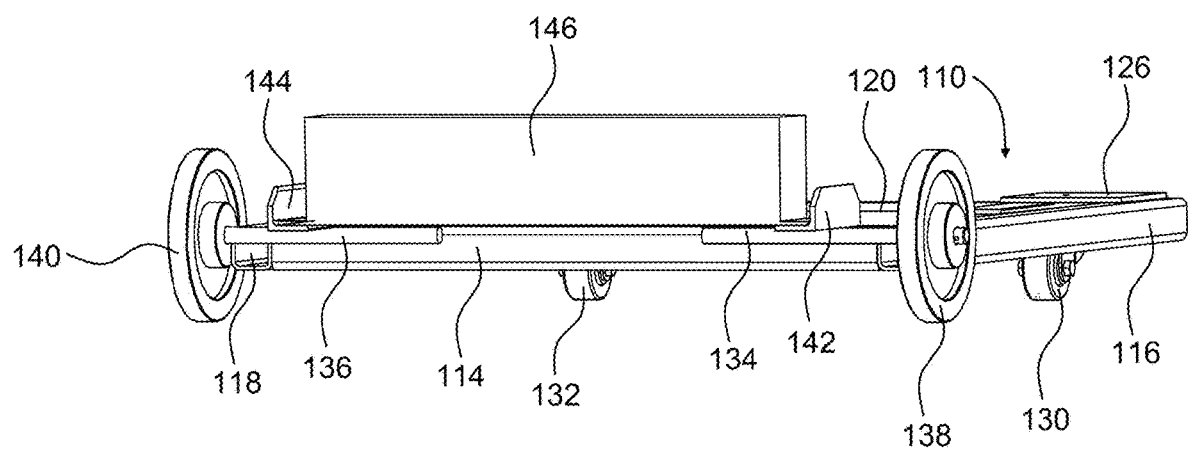
FIG. 26 is a back perspective view of the base of FIG. 25, in accordance with an aspect of the present invention.

With continued reference to FIGS. 1-11 and as best seen in FIGS. 23-26, the base portion 110 may include a frame 112 with a first support member 114, a second support member 116, a third support member 118, and a fourth support member 120. The support members 114, 116, 118, 120 may be secured together to form a relatively rectangular shape. As shown in FIGS. 23-25, the fourth support member 120 may be, for example, secured to the second and third support members 116, 118 slightly inside of the ends of the second and third support members 116, 118. The frame 112 may also include a first arm 122 and a second arm 124 coupled near opposite ends of the fourth support member 120. The first and second arms 122, 124 may extend from the fourth support member 120 in toward the center of the frame 112, for example, parallel to the second and third support members 116, 118 and perpendicular to the fourth support member 120. The base portion 110 may also include a first plate 126 and a second plate 128. The first plate 126 may be coupled to the top of the frame 112 and overlap with a portion of the second and fourth support members 116, 120. The second plate 128 may be coupled to the top of the frame 112 and overlap with a portion of the third and fourth support members 118, 120.

As shown in FIGS. 1, 4-6, and 24, the base portion 110 may further include a first wheel assembly 130 secured to a bottom surface of the first plate 126 and a second wheel assembly 132 secured to a bottom surface of the second plate 128. The first and second wheel assemblies 130, 132 may be, for example, swivel casters or another wheel that rotates to allow for steering of the apparatus 100. The base portion 110 may also include a first axle 134 secured to a first portion of the first support member 114 and a second axle 136 secured to a second portion of the first support member 114. The first and second portions of the first support member 114 being opposite ends of the first support member 114. The base portion 110 also includes a first rear wheel 138 coupled to the first axle 134 and a second rear wheel 140 coupled to the second axle 136. The base portion 110 may also include a brake coupled to the first and second rear wheels 138, 140 to stop the apparatus 100. Alternatively, the brake may attach to, for example, the frame 112 or back support structure 150, and rotate or swing from a storage position to a braking position wherein the brake contacts the floor under the apparatus 100 and the wheels 138, 140 to prevent the apparatus 100 from moving.

The base portion 110 may also include a first bracket 142 secured to, for example, a top surface of the first support member 114 above the first axle 134 and a second bracket 144 secured to, for example, a top surface of the first support member 114 above the second axle 136, as best seen in FIGS. 2, 4, 5, 7, 10 and 11. The first and second brackets 142, 144 are shaped to couple to a counter weight 146, for example, the first and second brackets 142, 144 may each include a ledge for receiving and coupling to a bottom surface of the counter weight 146.

Figure 2:
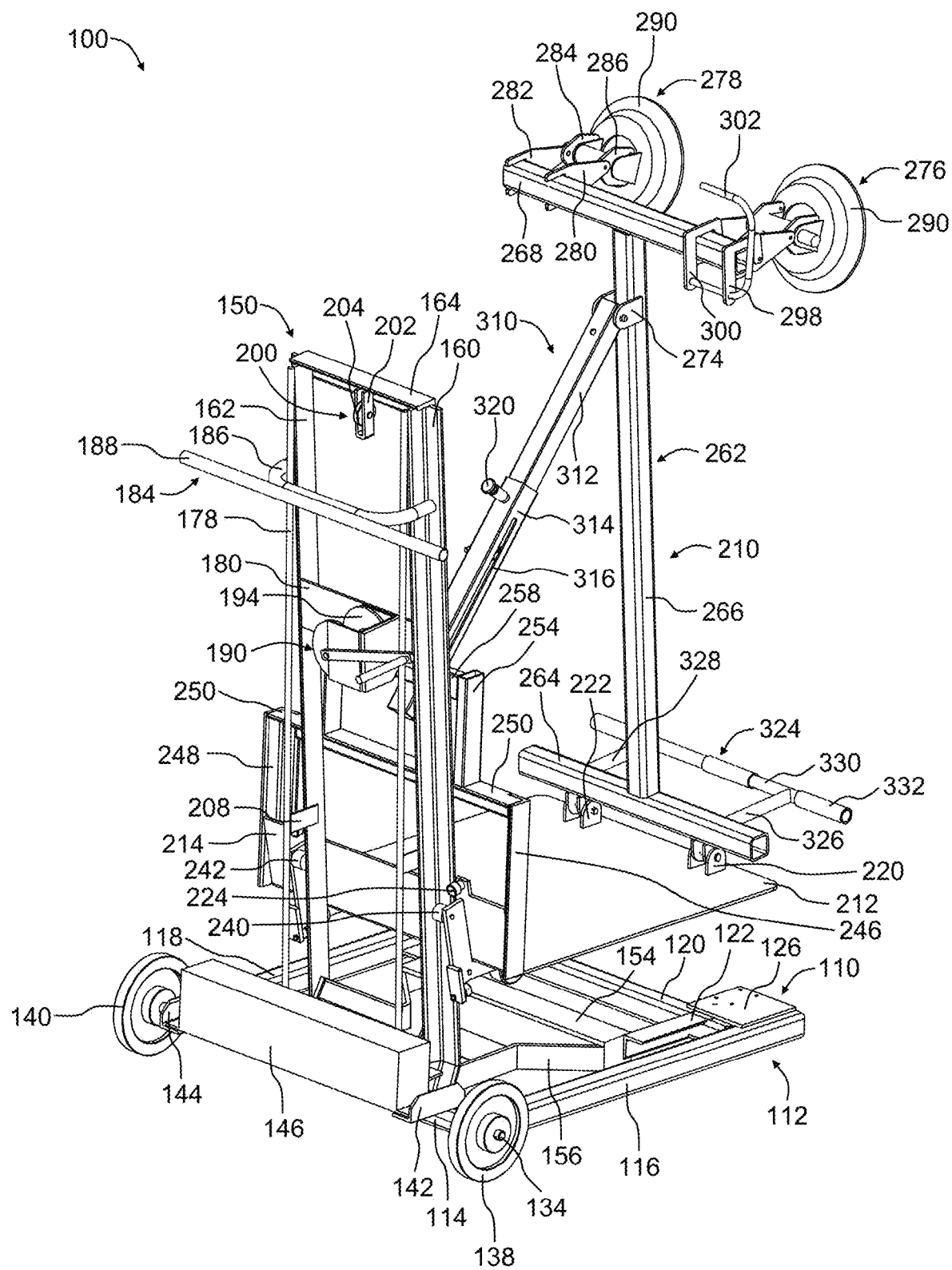
FIG. 2 is a rear perspective view of the apparatus of FIG. 1, in accordance with an aspect of the present invention.
Figure 3:
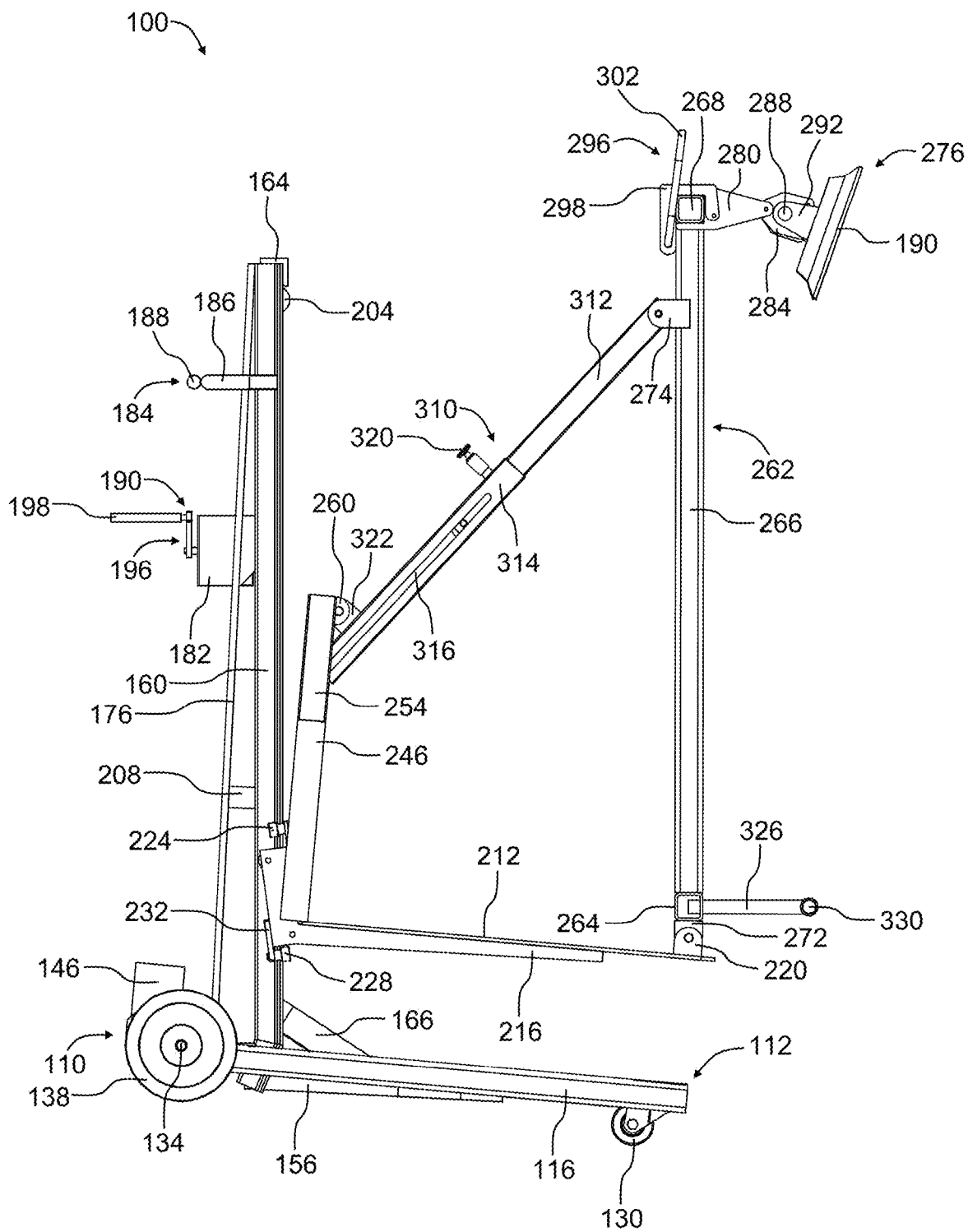
FIG. 3 is a side view of the apparatus of FIG. 1, in accordance with an aspect of the present invention.
Figure 4:
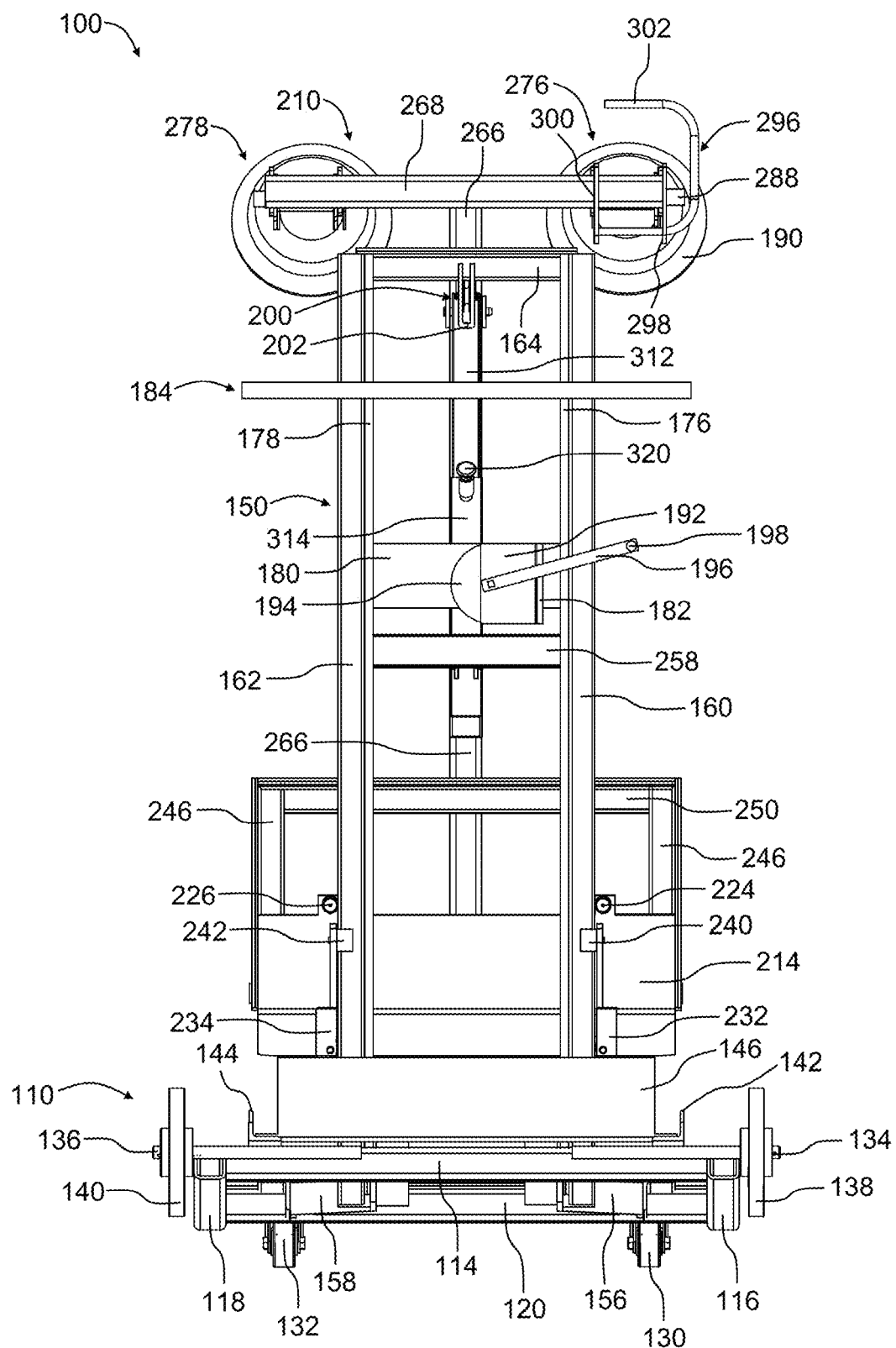
FIG. 4 is a rear view of the apparatus of FIG. 1, in accordance with an aspect of the present invention.
Figure 5:
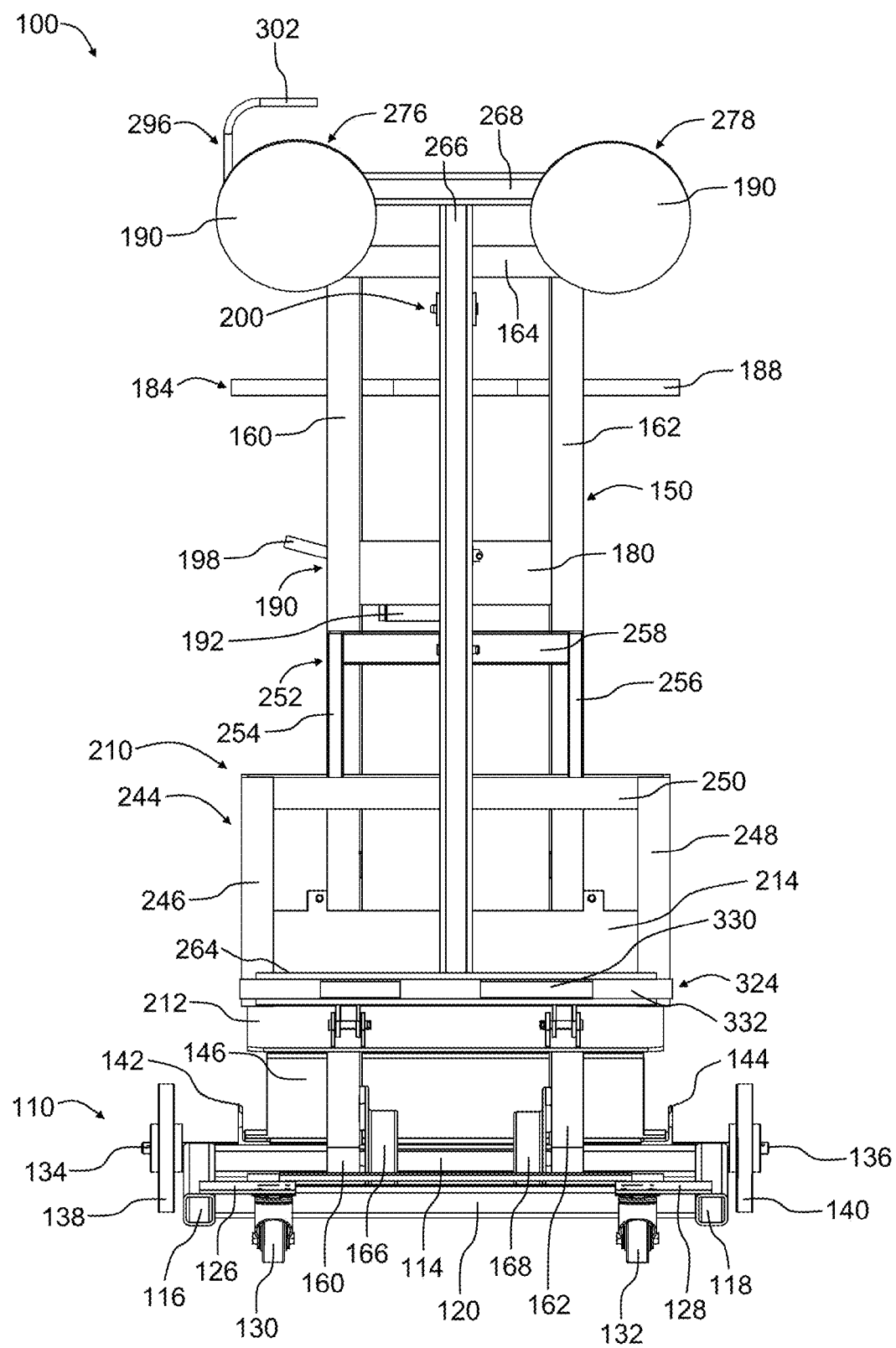
FIG. 5 is a front view of the apparatus of FIG. 1, in accordance with an aspect of the present invention.
Figure 6:
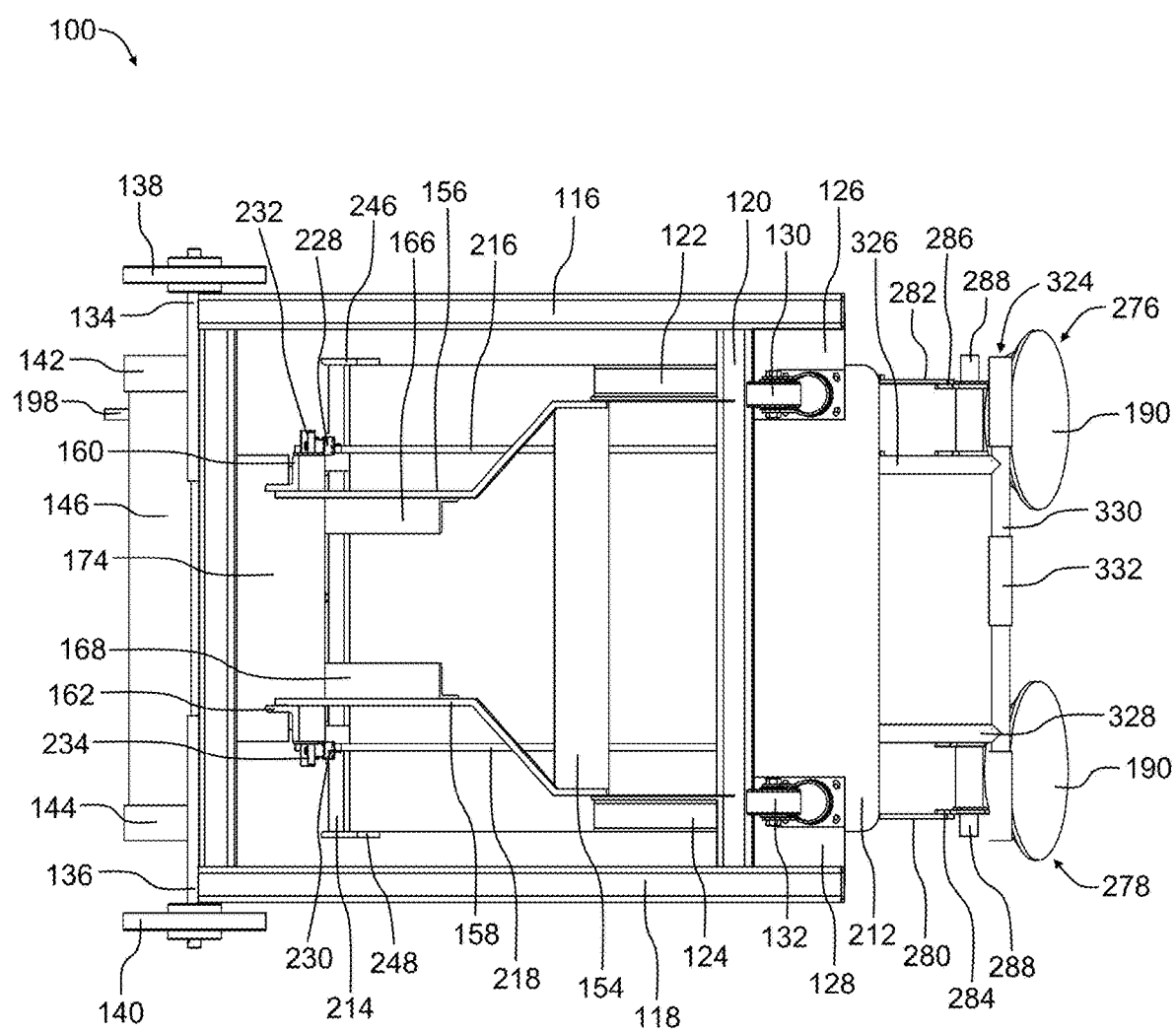
FIG. 6 is a bottom view of the apparatus of FIG. 1, in accordance with an aspect of the present invention.
Figure 7:
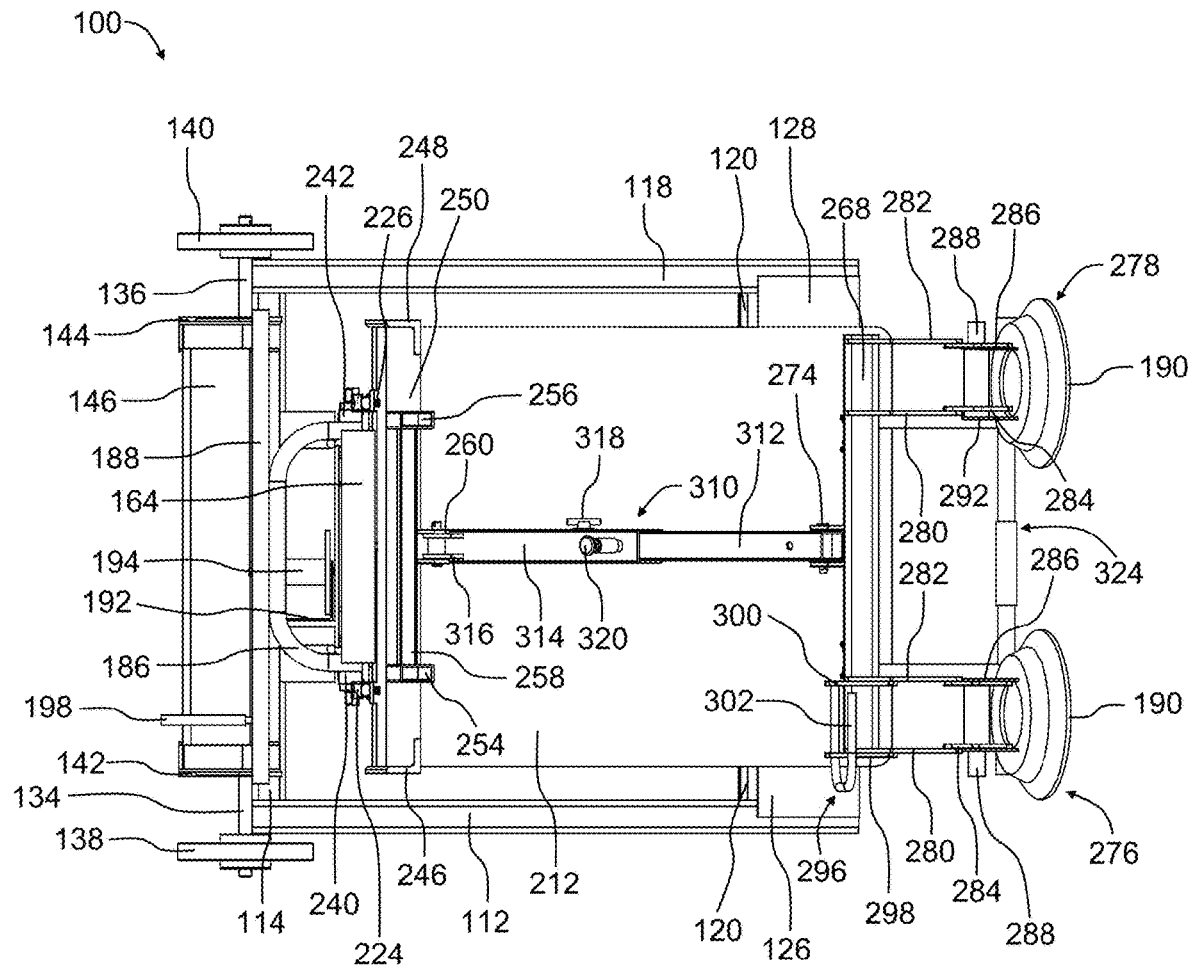
FIG. 7 is a top view of the apparatus of FIG. 1, in accordance with an aspect of the present invention.
Figure 8:
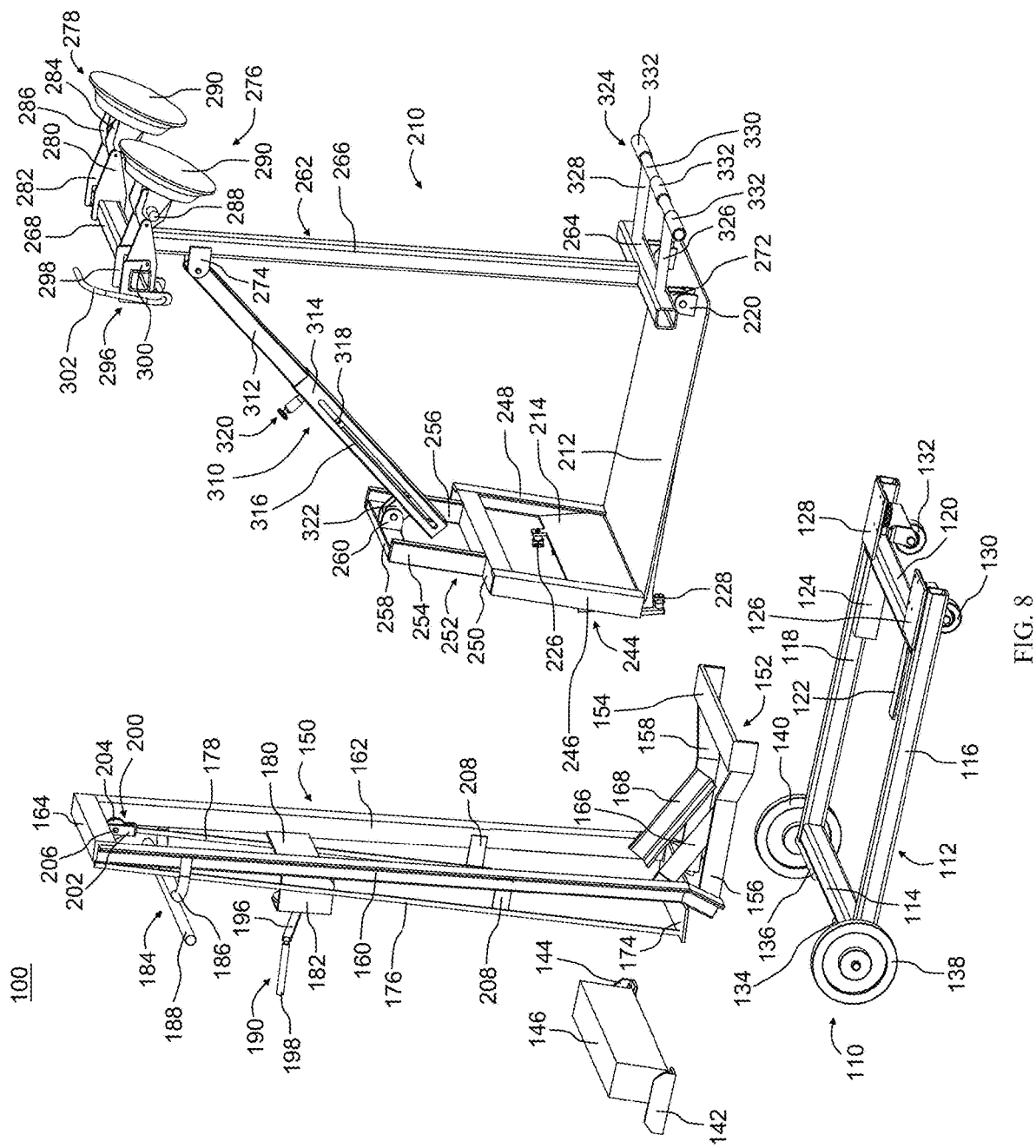
FIG. 8 is a partially exploded side perspective view of the apparatus of FIG. 1, in accordance with an aspect of the present invention.
Figure 9:
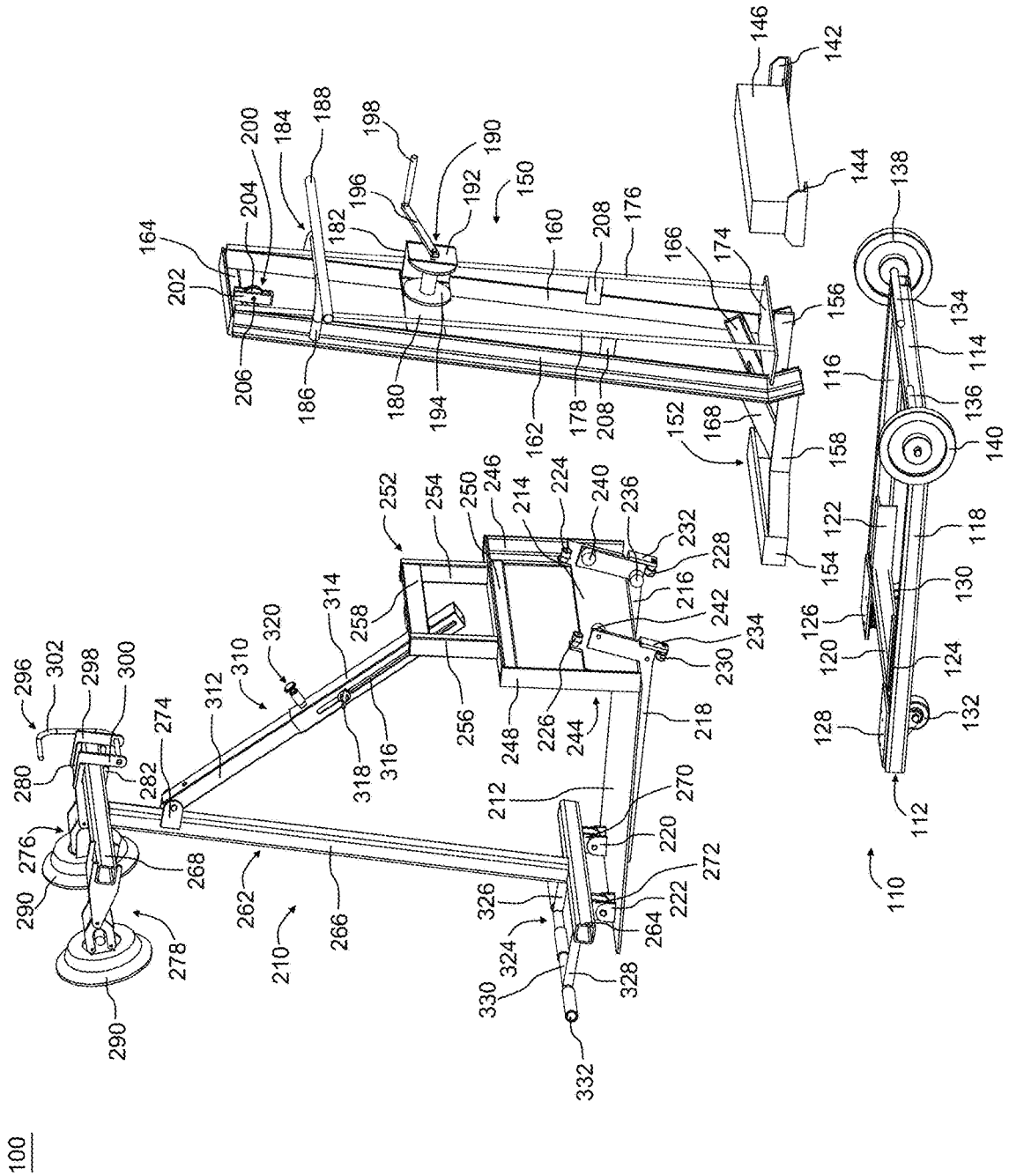
FIG. 9 is a partially exploded rear perspective view of the apparatus of FIG. 1, in accordance with an aspect of the present invention.
Figure 10:
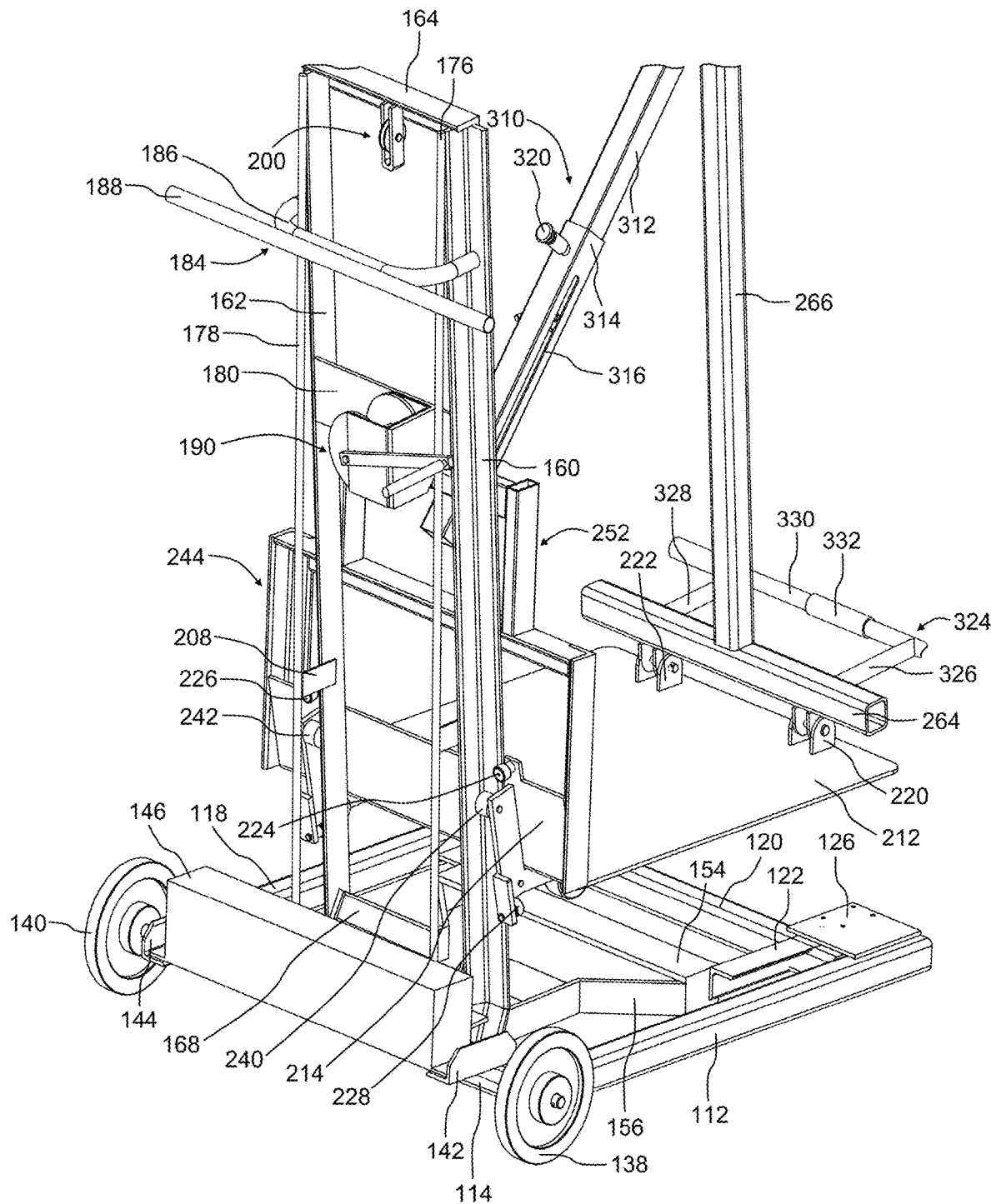
FIG. 10 is an enlarged rear perspective view of a portion of the apparatus of FIG. 1, in accordance with an aspect of the present invention.
Figure 11:
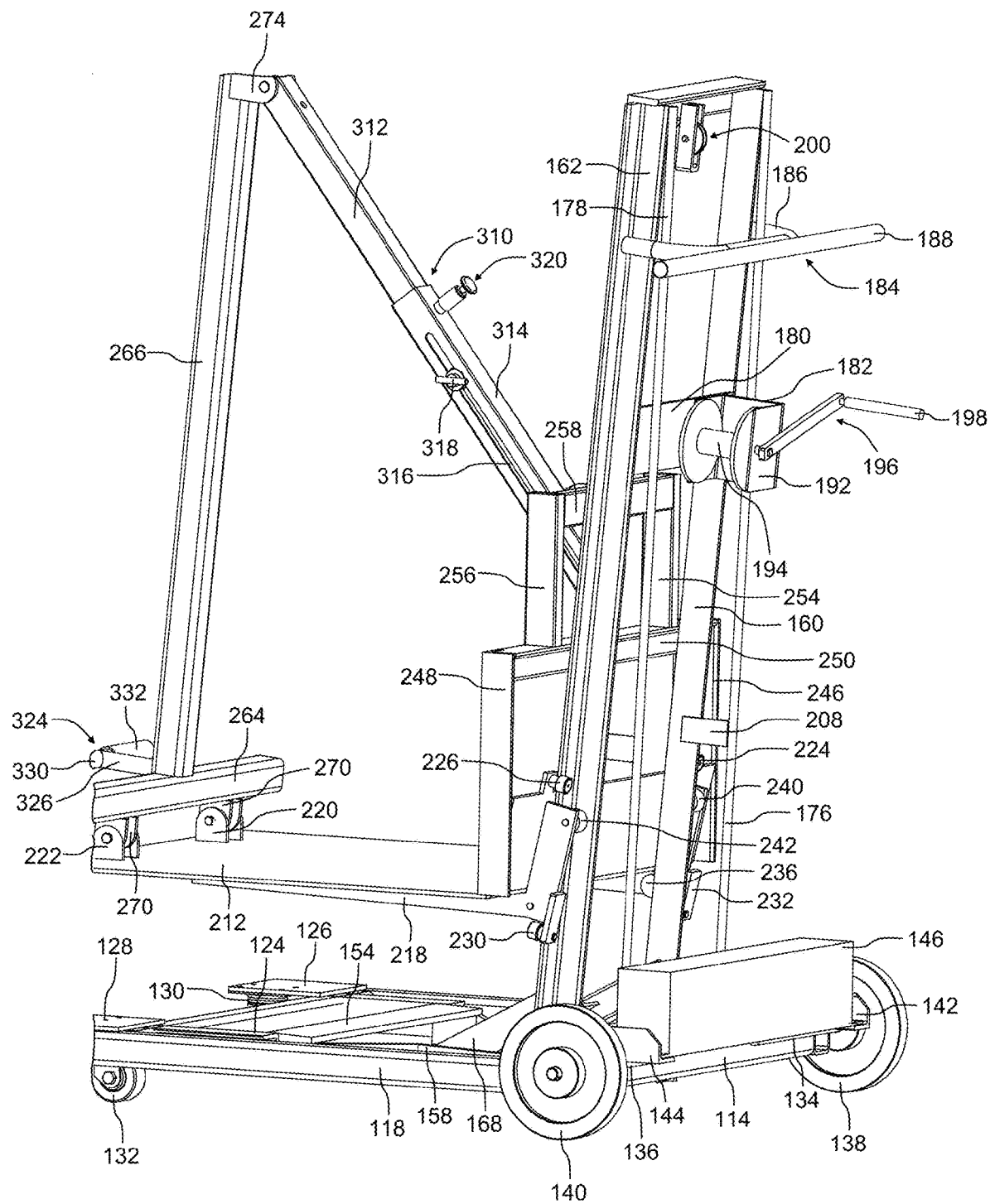
FIG. 11 is an enlarged side perspective view of a portion of the apparatus of FIG. 1, in accordance with an aspect of the present invention.

Referring now to FIGS. 1-12 and 14-18, the back support structure 150 is shown. The back support structure 150 may include a back support structure base 152 which couples to the base 110. The back support structure base 152 may include a brace member 154 with, for example, a first member and two perpendicular end plates coupled to each end of the first member. The brace member 154 may be secured to the first and second arms 122, 124, as shown in FIGS. 2, 6 and 10. With the brace member 154 secured to the first and second arms 122, 124 as shown, the back support structure base 152 is positioned within the frame 112 of the base portion 110. The back support structure base 152 may also include a first support arm 156 and a second support arm 158. The support arms 156, 158 may be secured to the brace member 154, for example, the perpendicular end plates of the brace member 154, at a first end.

The back support structure 150 may further include a first leg 160 and a second leg 162, as shown in FIGS. 1-12 and 14-18. The first and second legs 160, 162 may be positioned, for example, perpendicular to the back support structure base 152. The first and second legs 160, 162 may be, for example, straight along their entire length or angled on at least one end. As depicted in FIGS. 14-18, the legs 160, 162 are angled near a bottom end. The a bottom end of the first leg 160 is secured to a second end of the first support arm 156 and a bottom end of the second leg 162 is secured to a second end of the second support arm 158. The brace member 154 may have, for example, a width greater than the width between the first and second legs 160, 162. If the width of the brace member 154 is greater than the width between the first and second legs 160, 162, then the support arms 156, 158 may include, for example, a straight portion extending out from each of the first and second legs 160, 162 and an angled portion connecting the straight portion of the support arms 156, 158 to the end plates of the brace member 154. The top ends of the first and second legs 160, 162 may be coupled to opposite ends of a crossbar 164.

Referring now to FIGS. 1-6, 8-11, and 14-18, the back support structure 150 also includes a first angled support 166 and a second angled support 168. The first angled support 166 is secured to the first support arm 156 on one end and the first leg 160 on a second end. The second angled support 168 is secured to the second support arm 158 on one end and the second leg 162 on a second end. The angled supports 166, 168 may be, for example, secured directly to the legs 160, 162 or alternatively may be secured to the legs 160, 162 using spacer members 170, 172. As shown in FIGS. 14-17, a first spacer member 170 may be coupled to the leg 160 on a first side and the first angled support 166 on a second side. Also as shown in FIGS. 14-17, a second spacer member 172 may be coupled to the leg 162 on a first side and the second angled support 168 on a second side. The first and second sides of the spacer members 170, 172 may be opposite each other.

The back support structure 150 may also include a rear support member 174, as shown in FIGS. 6, 8, 9, and 14-18. A back side of the rear support member 174 may be secured to the first support member 114. At least a portion of each side of the rear support member 174 may be secured to the first and second legs 160, 162 near a front side of the rear support member 174. In addition, the back support structure 150 may include a first rod 176 and a second rod 178. The first rod 176 is coupled to a top end of the first leg 160 at a first end and the rear support member 174 at a second end. The second rod 178 is coupled to a top end of the second leg 162 at a first end and the rear support member 174 at a second end. The first rod 176 may also be secured to the first leg 160 with a support plate 208 between the first end and the second end of the first rod 176. A first end of the support plate 208 may be secured to the first leg 160 and a second end of the support plate 208 may be secured to the first rod 176, as shown in FIGS. 2, 8-10, 14, and 16-18. The second rod 178 may also be secured to the second leg 162 with a support plate 208 between the first end and the second end of the second rod 178. A first end of the support plate 208 may be secured to the second leg 162 and a second end of the support plate 208 may be secured to the second rod 178, as shown in FIGS. 2, 8-10, 14, and 16-18.

Figure 27:
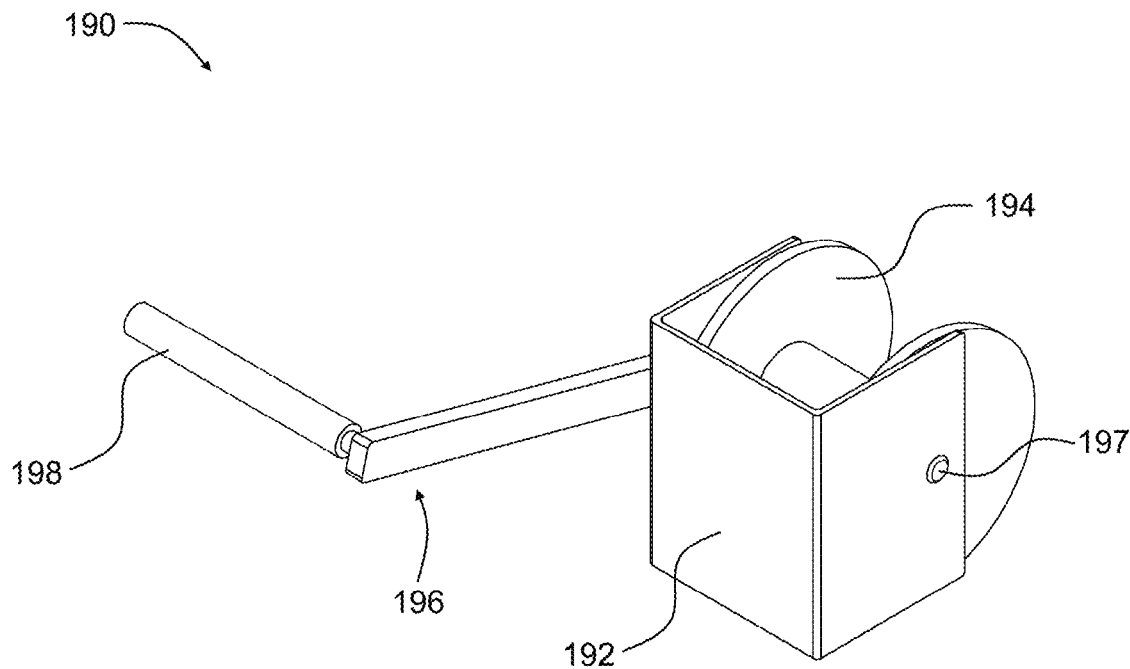
FIG. 27 is a first side perspective view of a winch of the apparatus of FIG. 1, in accordance with an aspect of the present invention.
Figure 28:
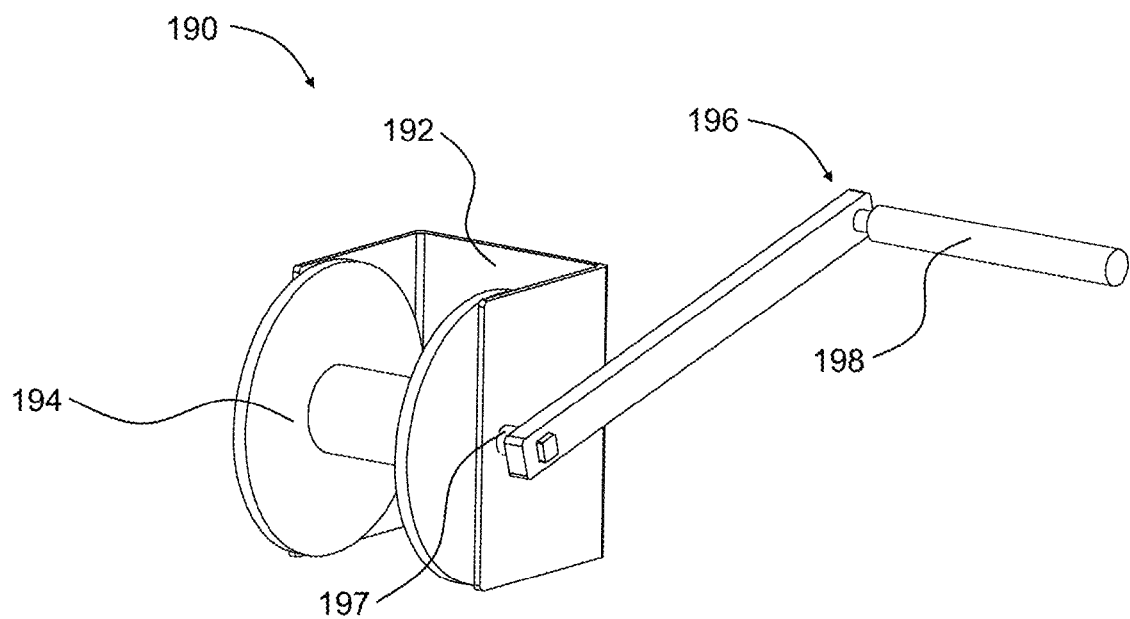
FIG. 28 is a second side perspective view of the winch of FIG. 27, in accordance with an aspect of the present invention.
Figure 29:
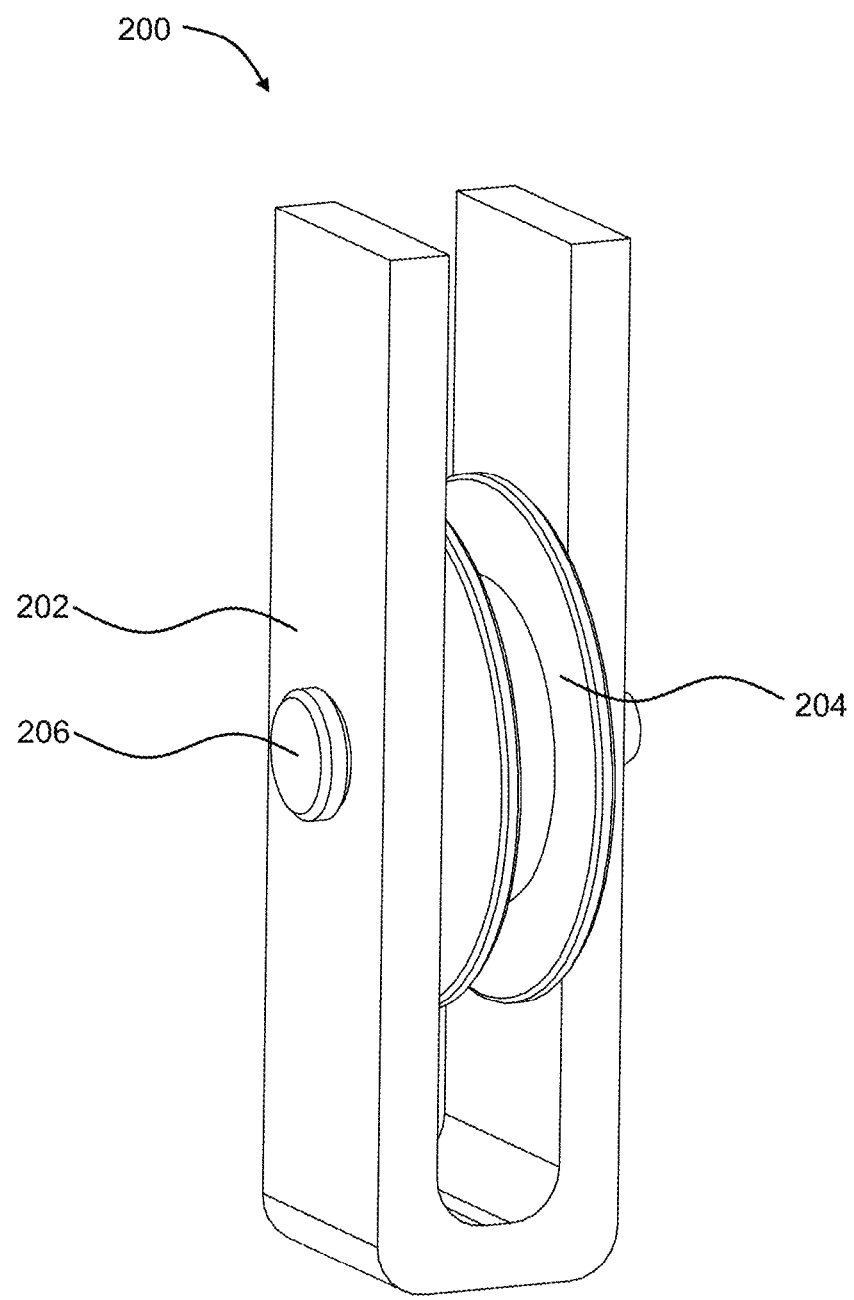
FIG. 29 is a perspective view of a pulley assembly of the apparatus of FIG. 1, in accordance with an aspect of the present invention.

As shown in FIGS. 2, 4, 9-12, and 14-15, the back support structure 150 may also include a winch support member 180. The winch support member 180 may be secured to the first leg 160 on one end and the second leg 162 on a second end. The winch support member 180 may also include a winch mount 182 extending out perpendicular from the main plate of the winch support member 180. The winch mount 182 is sized to couple to a winch 190, as shown in FIGS. 2, 4, 9-12, 14 and 15. The winch 190, as best seen in FIGS. 27-28, may include a winch base 192. The winch base 192 may include a back and two sides extending out perpendicularly from the back. In addition, the winch 190 includes a spool 194 for receiving the cable (not shown) and a hand crank 196 for turning the spool 194 to wind up or release the cable. The hand crank 196 may include a pin 197 and a handle 198. The pin 197 may extend through the spool 194 to rotate the spool 194 as the handle 198 is turned. The winch 190 may be, for example, operated manually, automatically, or include both a manual and automatic feature. The manual winch 190 may be operated by a user rotating the handle 198 to raise and lower the glass adjustment system 210. An automatic winch 190 may include, for example, a power source and controller to rotate the handle 198 and/or spool 194 to raise and lower the glass adjustment system 210. In an embodiment including both a manual and automatic winch 190, the apparatus 100 will also include a switch to change from a manual to an automatic winch 190 as desired.

In addition, the back support structure 150 may include an upper handle 184, as shown in FIGS. 1-5, 7-12, and 14-18. The upper handle 184 may include a handle support member 186 coupled to the first leg 160 on a first end and to the second leg 162 on a second end. The handle support member 186 may be, for example, curved to extend around the back of the back support structure 150. The upper handle 184 may also include a push handle 188 coupled to a center portion of the handle support member 186. The upper handle 184 may be used for moving the apparatus 100.

Referring now to FIGS. 1, 2, 4, 8-12, 14-15, and 29, a pulley assembly 200 of the back support structure is shown. The pulley assembly 200 includes a pulley base 202, a rotating member 204 positioned within the pulley base 202, and a pin 206 extending through the pulley base 202 and the rotating member 204. The pulley base 202 may be, for example, generally U-shaped and the open end of the pulley base 202 may be secured to the crossbar 164. The pin 206 allows for the rotating member 204 to rotate with respect to the pulley base 202 as a cable (not shown) moves over a channel in the rotating member 204. The cable (not shown) may be moved by rotating the handle 198 of the winch 190 in a clockwise or counterclockwise direction.

The glass adjustment system 210 is shown in FIGS. 1-9, 12, 13, and 19-22. The glass adjustment system 210 may include a tray 212 with a back 214 which may be positioned angled with respect to the tray 212. The back 214 may be, for example, positioned relatively perpendicular to the tray 212. The back 214 may include a first tab with a first top guide wheel 224 coupled to a back side of the first tab and a second tab with a second top guide wheel 226 coupled to a back side of the second tab. The first tab may be on a first side of the back 214, for example, the right side, and the second tab may be on a second side of the back 214, for example, the left side. The system 210 may also include a first front coupling member 220 and a second front coupling member 222, as shown in FIGS. 1, 2, 5, 9-11, and 19-20. The first front coupling member 220 may include a first and second portion and be positioned on a top surface of the tray 212 on the first side. The second front coupling member 222 may include a first and second portion and be positioned on the top surface of the tray 212 on the second side.

The system 210 may also include a first tray support arm 216 and a second tray support arm 218, as depicted in FIGS. 6, 9, 20 and 21. The first tray support arm 216 may couple to and extend along a bottom surface of the tray 212 and up at least a portion of the back 214 on a first side of the tray 212. The portion of the first tray support arm 216 extending along the back 214 may be positioned below the first top guide wheel 224. The second tray support arm 218 may couple to and extend along a bottom surface of the tray 212 and up at least a portion of the back 214 on a second side of the tray 212 opposite the first tray support arm 216. The portion of the second tray support arm 218 extending along the back 214 may be positioned below the second top guide wheel 226. The system 210 may also include a first wheel support bar 232 coupled to the first tray support arm 216 and a second wheel support bar 234 coupled to the second tray support arm 218. The first and second wheel support bars 232, 234 may be coupled to the portion of the first and second tray support arms 216, 218 that extend along the back 214. The first and second wheel support bars 232, 234 may also extend below the first and second tray support arms 216, 218. A first bottom guide wheel 228 may be coupled to a front side of the first wheel support bar 232 and a second bottom guide wheel 230 may be coupled to a front side of the second wheel support bar 234.

Figure 21:
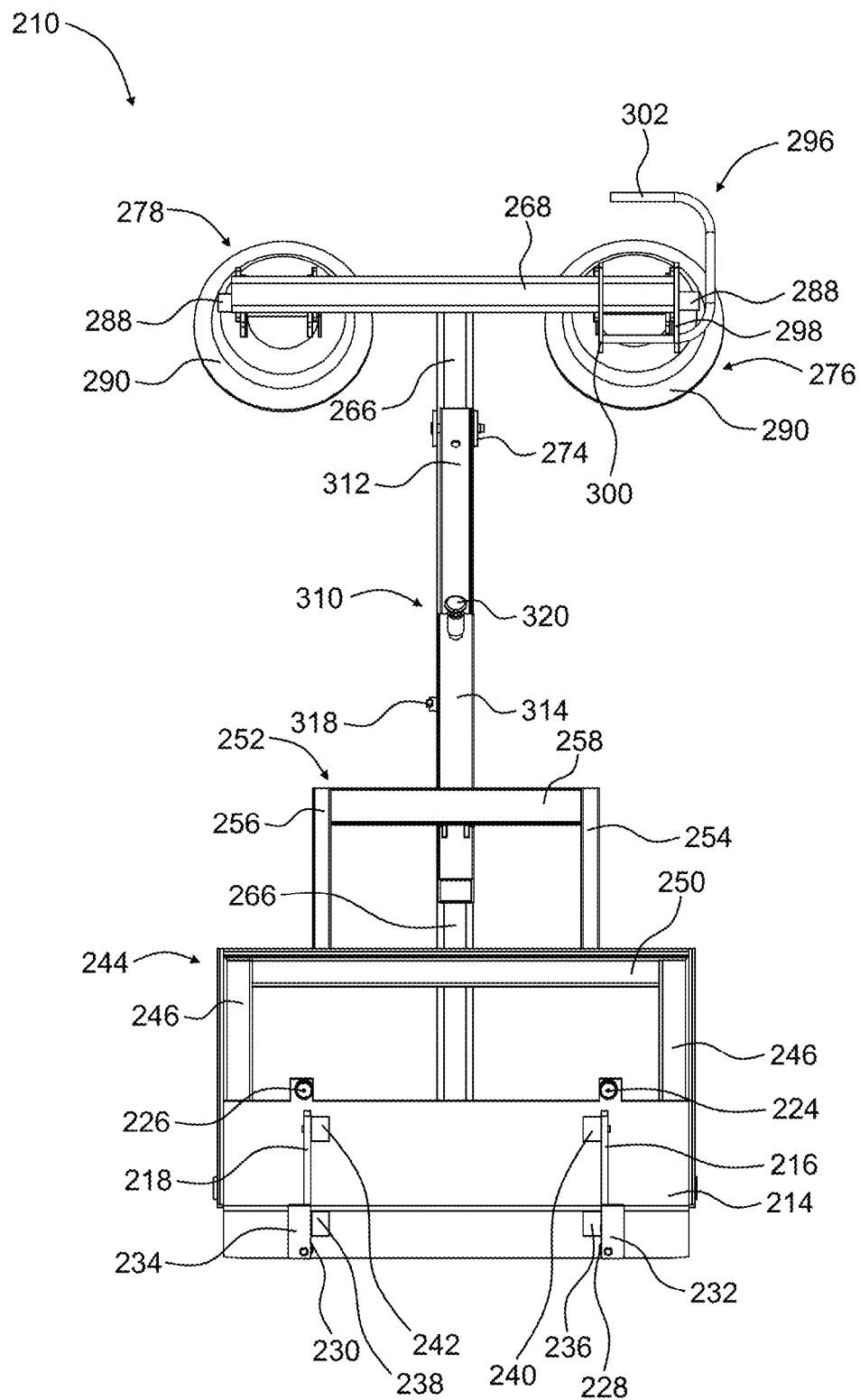
FIG. 21 is a back view of the glass adjustment system of FIG. 19, in accordance with an aspect of the present invention.
Figure 22:
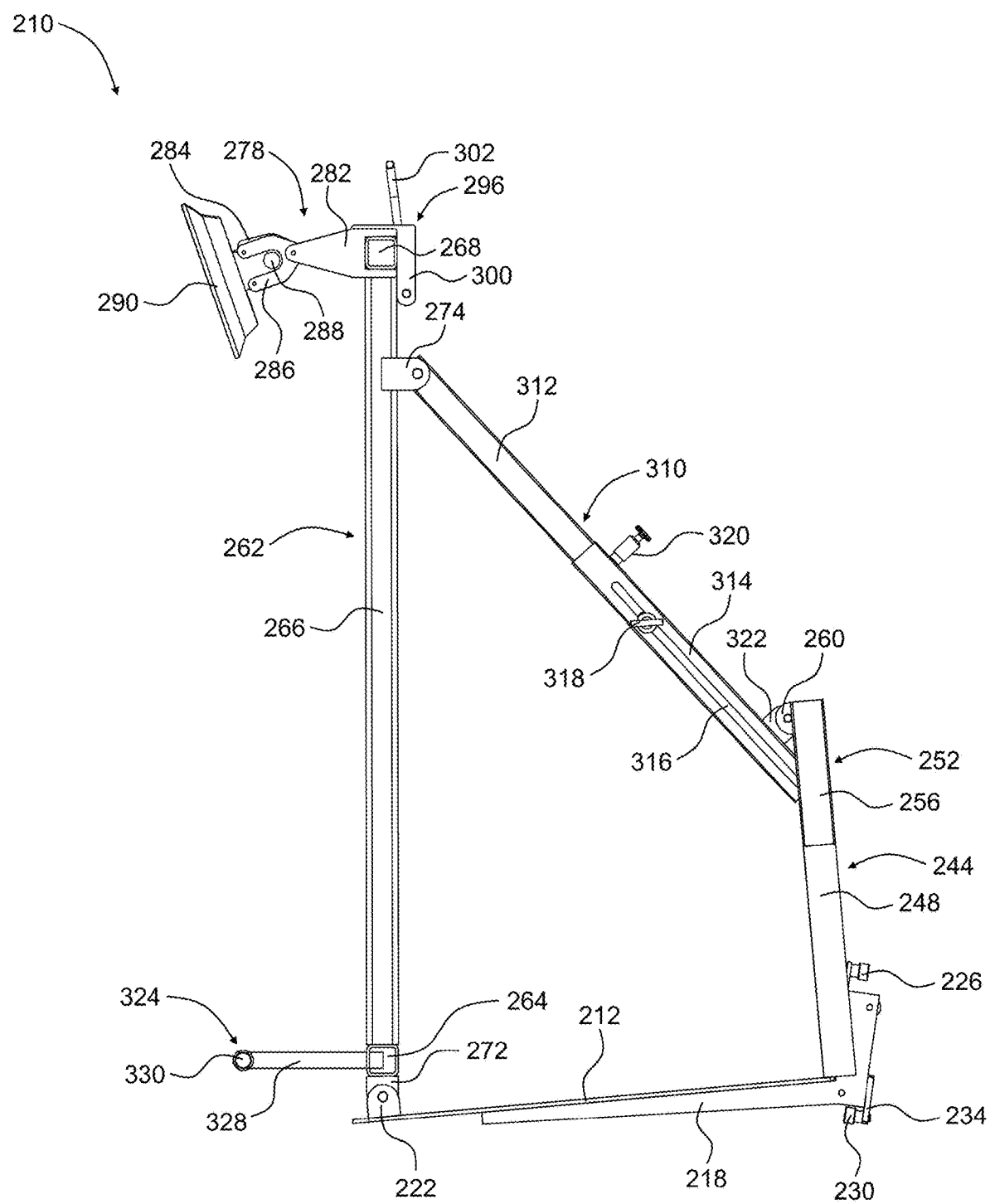
FIG. 22 is a side view of the glass adjustment system of FIG. 19, in accordance with an aspect of the present invention.

As shown in FIG. 21, the system 210 may also include a first front guide wheel 236 and a second front guide wheel 238. The first front guide wheel 236 may be rotatably coupled to the first tray support arm 216 near the corner where the tray 212 meets the back 214. The second front guide wheel 238 may be rotatably coupled to the second tray support arm 218 near the corner where the tray 212 meets the back 214. The first and second front guide wheels 236, 238 may each be positioned, for example, on the inside of the first and second tray support arms 216, 218 and across from each other. As shown in FIGS. 2, 4, 9-11, 20, and 21, the system 210 may also include a first back guide wheel 240 and a second back guide wheel 242. The first back guide wheel 240 may be rotatably coupled to a top of the portion of the first tray support arm 216 that extends along the back 214. The second back guide wheel 242 may be rotatably coupled to a top of the portion of the second tray support arm 218 that extends along the back 214. The first and second back guide wheels 240, 242 may each be positioned, for example, on the inside of the first and second tray support arms 216, 218 and across from each other.

The system 210 may also include a lower tray back support 244 coupled to at least one of the tray 212 and the back 214, as shown in FIGS. 1, 2, 4, 5, 8-12, and 19-21. The lower tray back support 244 may include a first leg 246 secured to a first side of at least one of the tray 212 and the back 214, a second leg 248 secured to a second side of the at least one of the tray 212 and the back 214, and a lower cross member 250 connecting a top of the first leg 246 to a top of the second leg 248. The system 210 may also include an upper tray back support 252 coupled to the lower cross member 250. The upper track back support 252 may include a first upper leg 254, a second upper leg 256, and an upper cross member 258 connecting a top of the first upper leg 254 and a top of the second upper leg 256. The upper track back support 252 may also include an upper coupling member 260 secured to a side of the upper cross member 258.

Referring now to FIGS. 1-3, 8, 9, and 19-22, a glass support member 262 of the system 210 is shown. The glass support member 262 may include a base member 264, a vertical member 266, and a top support member 268. The vertical member 266 may be coupled on a first end to a center portion of the base member 264 and on a second end to a center portion of the top support member 268. The base member 264, vertical member 266, and top support member 268 may form, for example, a generally I-shaped arrangement. The glass support member 262 may also include a first pivoting member 270 secured to a bottom of the base member 264 on a first side and a second pivoting member 272 secured to a bottom of the base member 264 on a second side. The first and second pivoting members 270, 272 may be sized to fix inside of the first and second front coupling members 220, 222, respectively. The first and second pivoting members 270, 272 may be, for example, hingedly coupled to the first and second front coupling members 220, 222. The hinged arrangement allows for the glass support member 262 to be angled with respect to the tray 212. The support member 262 may be angled with respect to the tray 212 at an angle between, for example, 0° and 90° and preferably between approximately 0° and 30°. The glass support member 262 also includes a coupling member 274 secured to the vertical member 266 near a top portion of the vertical member 266.

Figure 12:
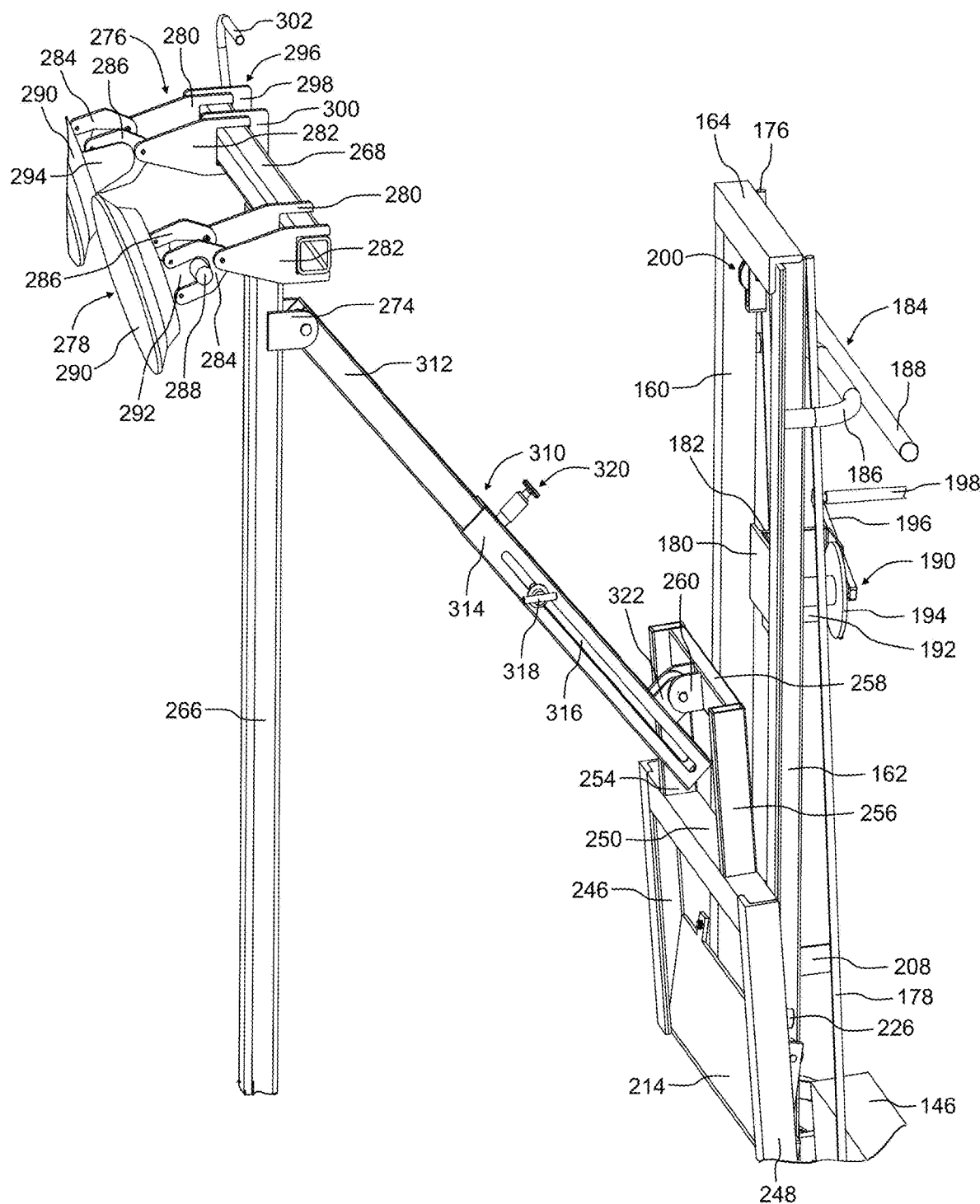
FIG. 12 is an enlarged side perspective view of a portion of the apparatus of FIG. 1, in accordance with an aspect of the present invention.
Figure 13:
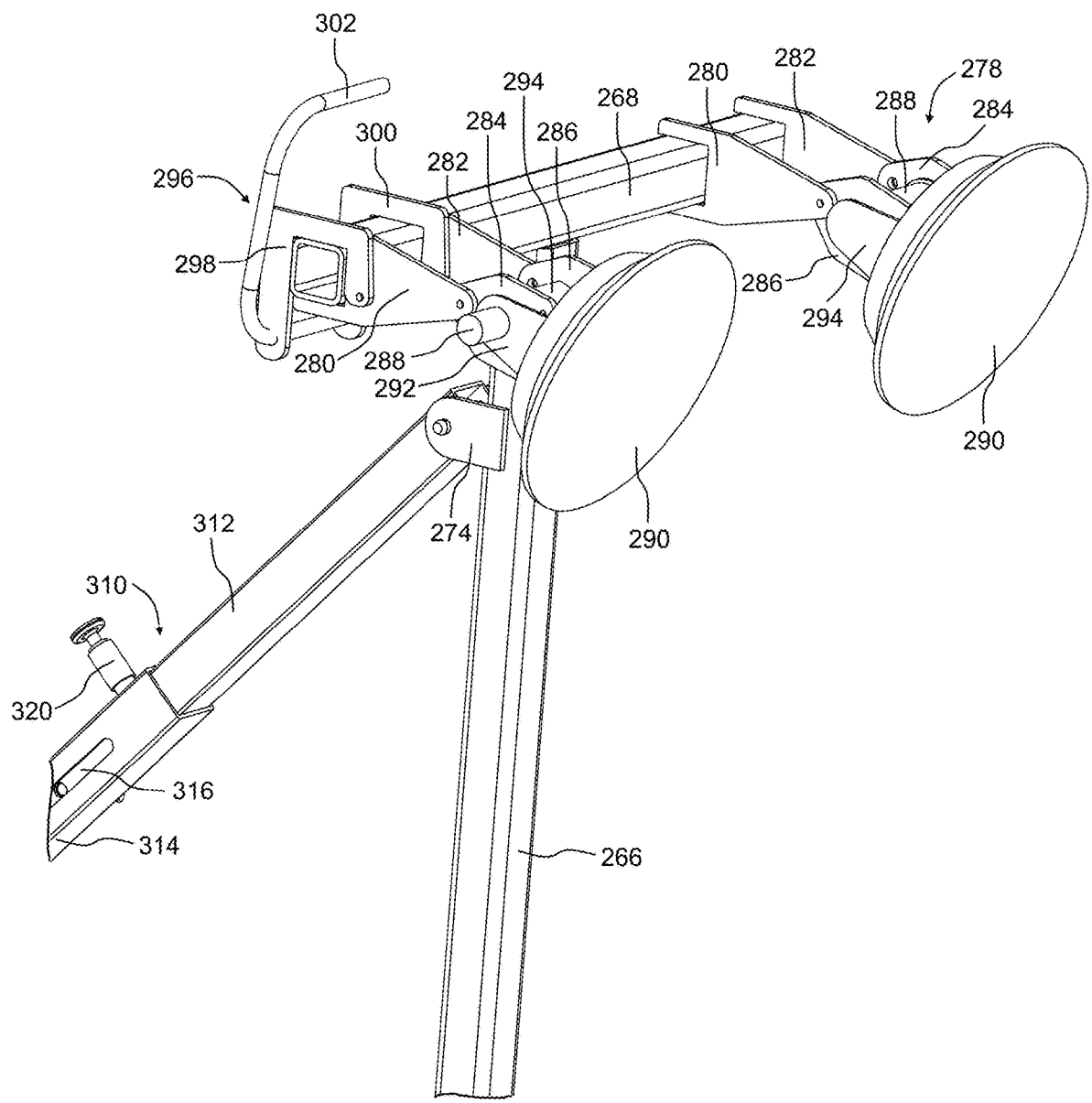
FIG. 13 is an enlarged perspective view of a portion of a glass adjustment system of the apparatus of FIG. 1, in accordance with an aspect of the present invention.
Figure 14:
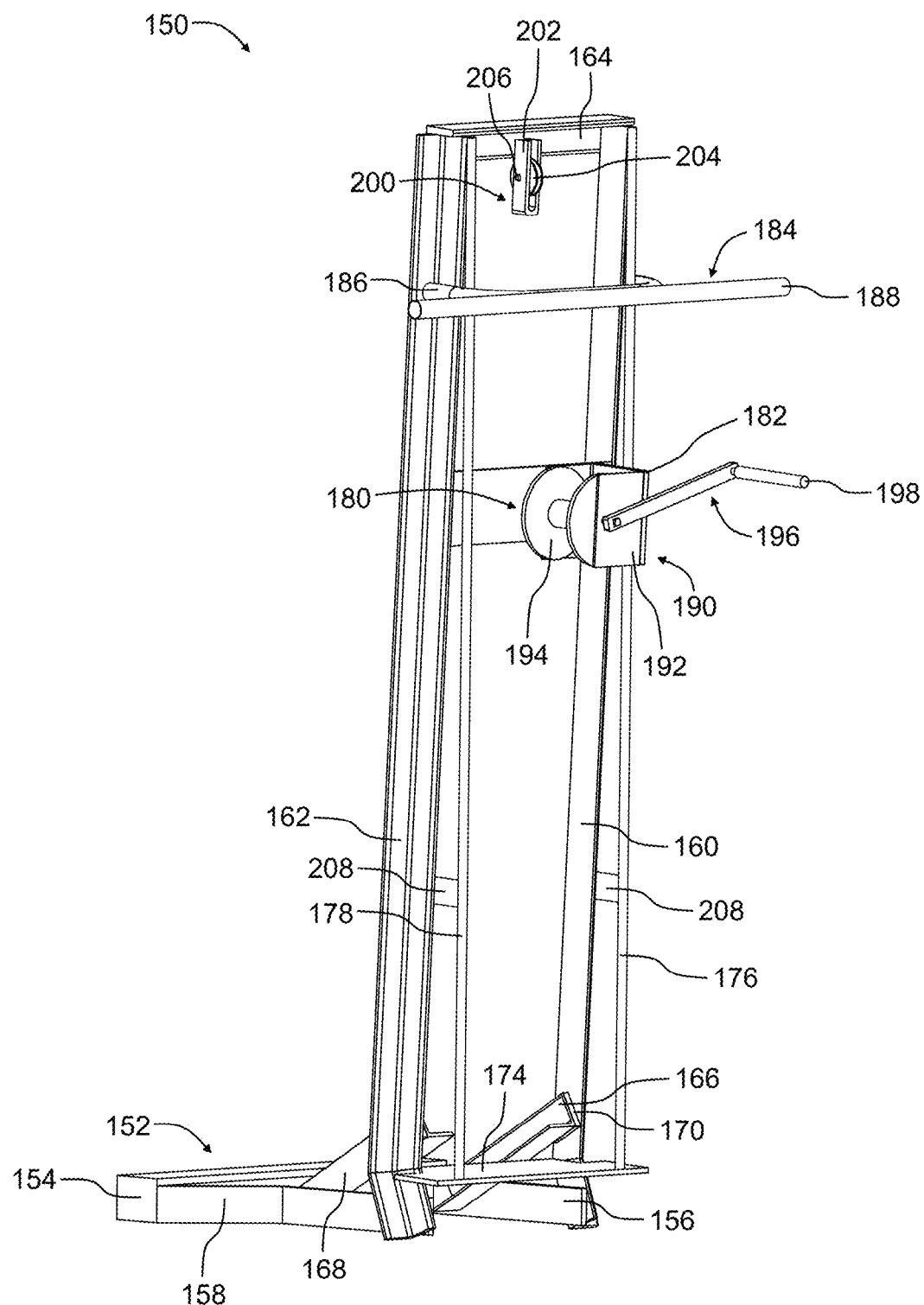
FIG. 14 is a rear perspective view of an a back support structure of the glass installation apparatus of FIG. 1, in accordance with an aspect of the present invention.
Figure 15:
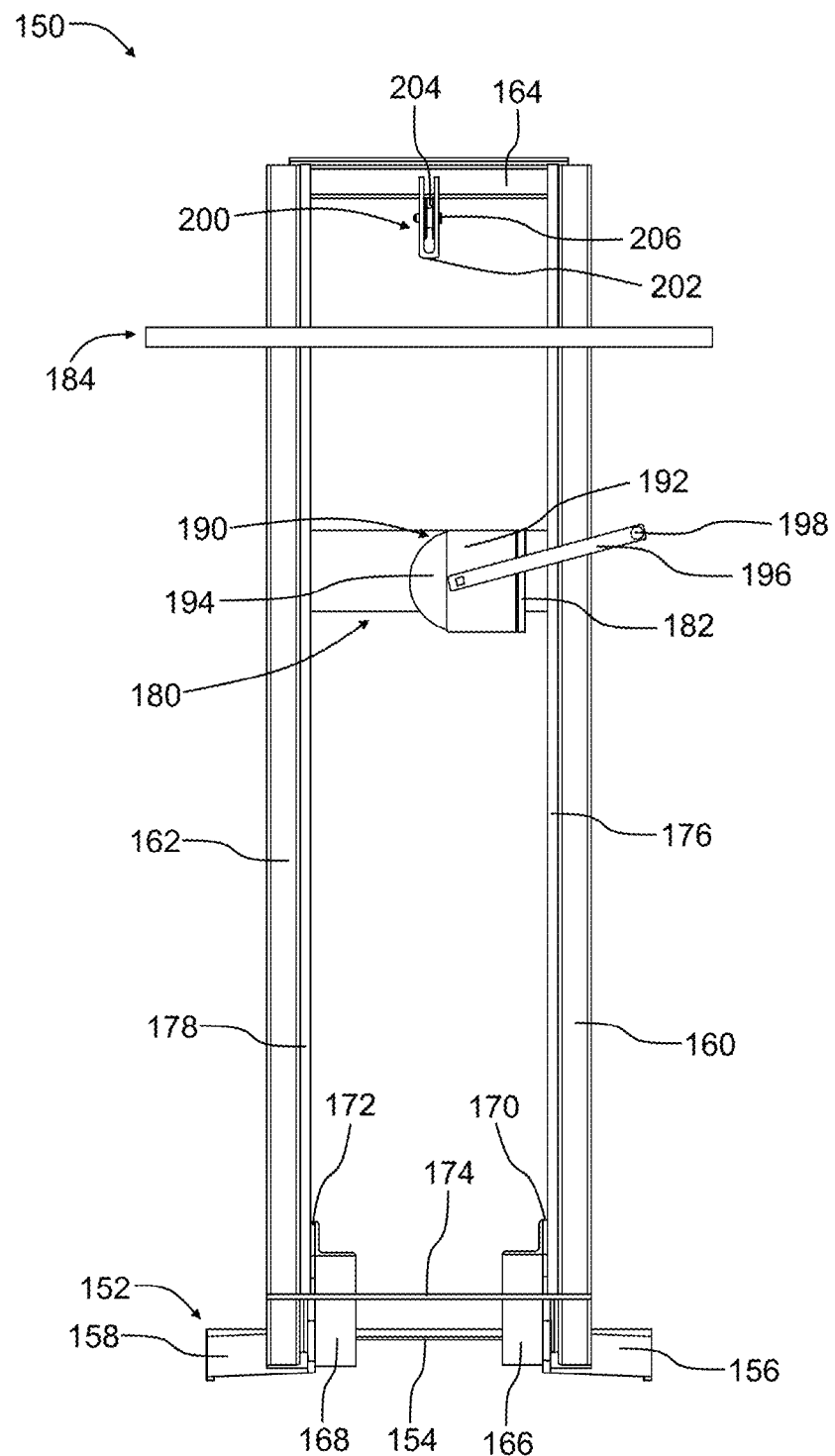
FIG. 15 is a rear view of the back support structure of FIG. 14, in accordance with an aspect of the present invention.
Figure 16:
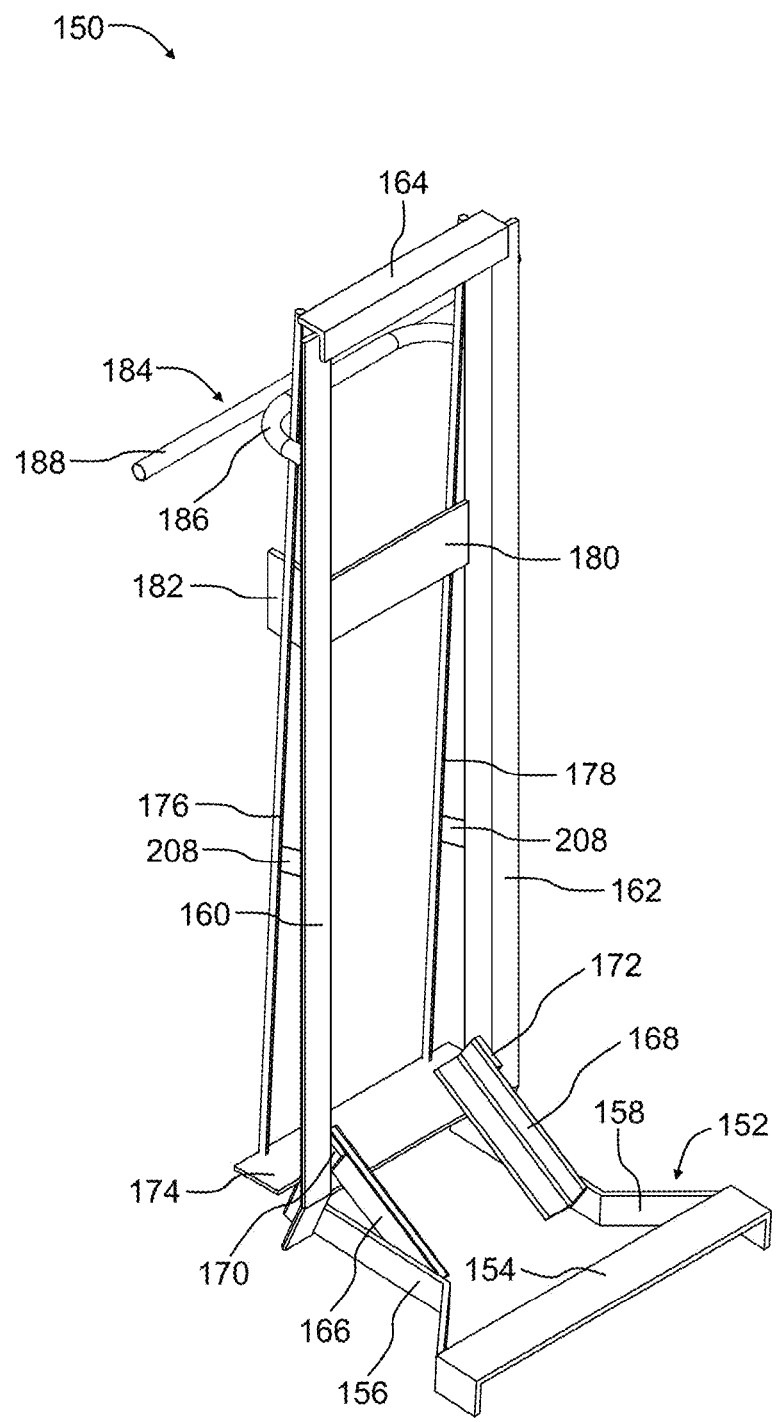
FIG. 16 is a top perspective view of a portion of the back support structure of FIG. 14, in accordance with an aspect of the present invention.
Figure 17:
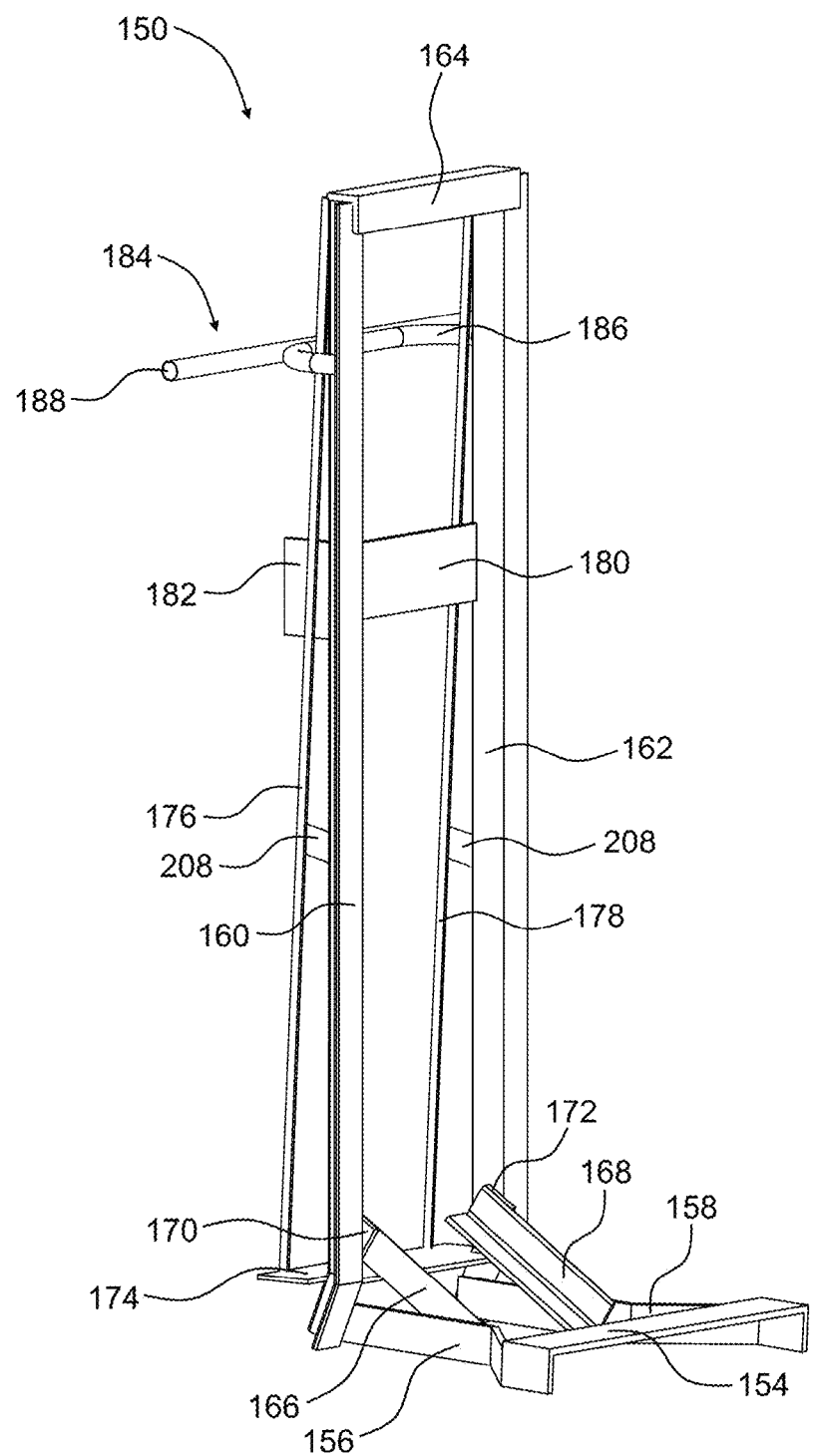
FIG. 17 is a side perspective view of the portion of the back support structure of FIG. 16, in accordance with an aspect of the present invention.
Figure 18:
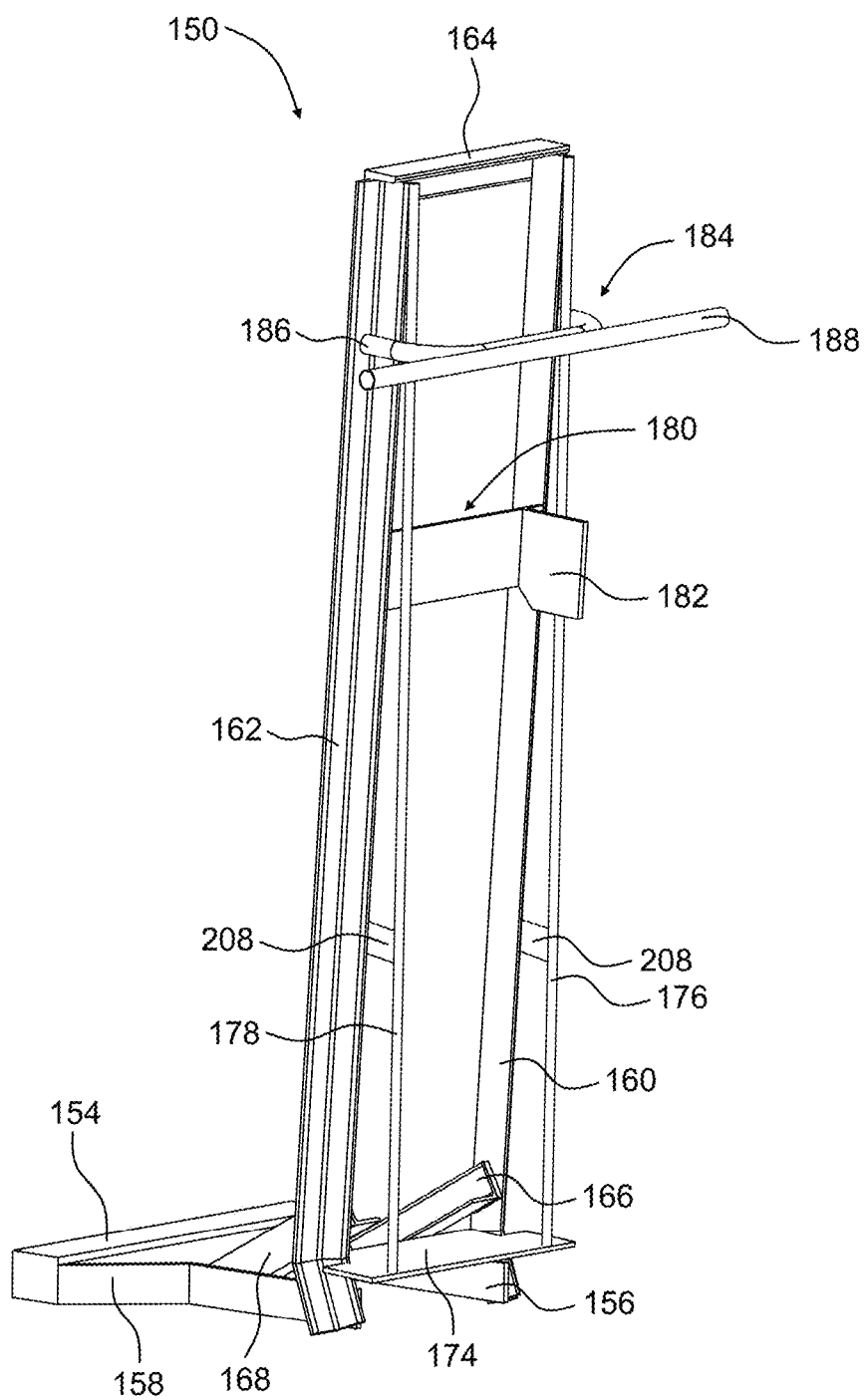
FIG. 18 is a rear perspective view of the portion of the back support structure of FIG. 16, in accordance with an aspect of the present invention.
Figure 19:
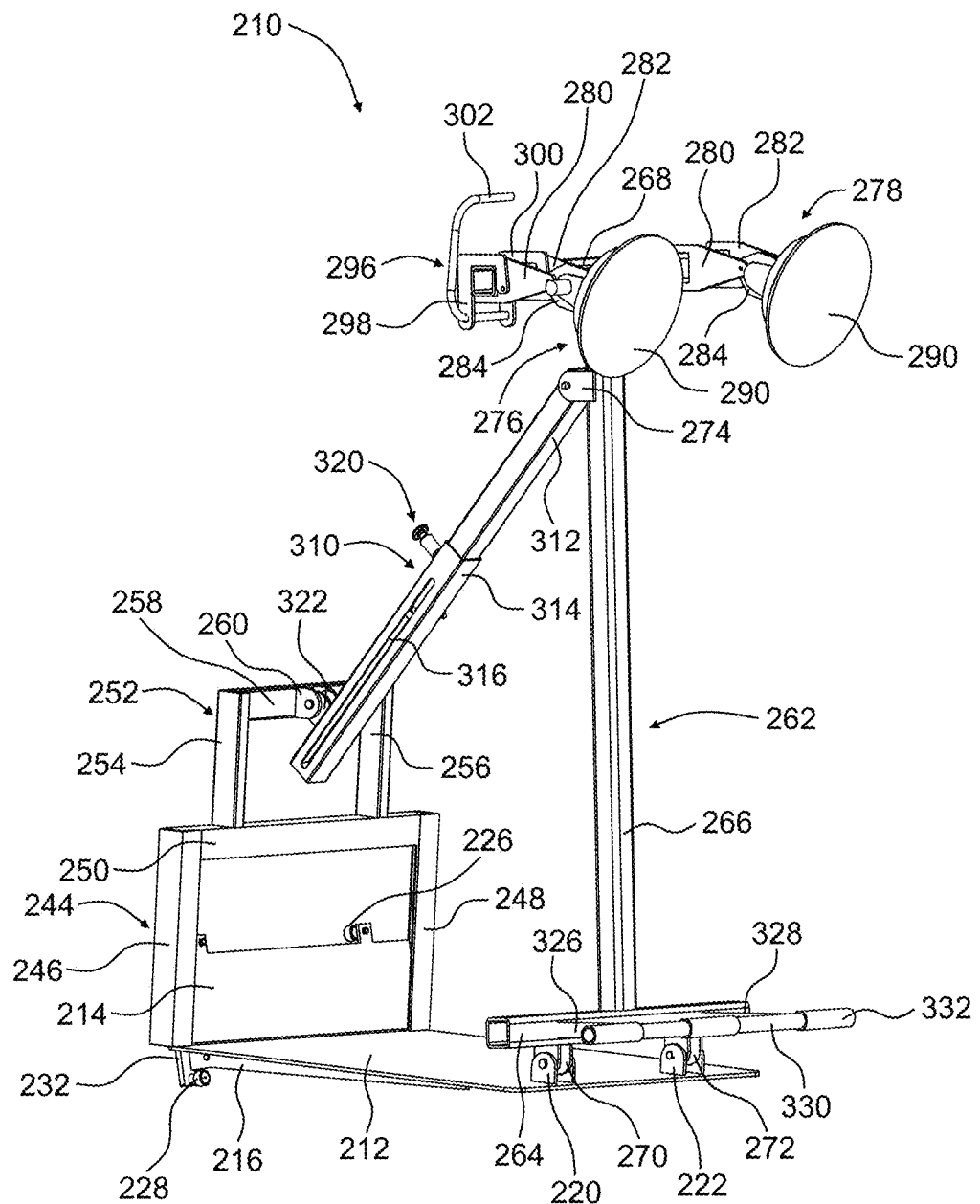
FIG. 19 is a side perspective view of the glass adjustment system of the apparatus of FIG. 1, in accordance with an aspect of the present invention.
Figure 20:
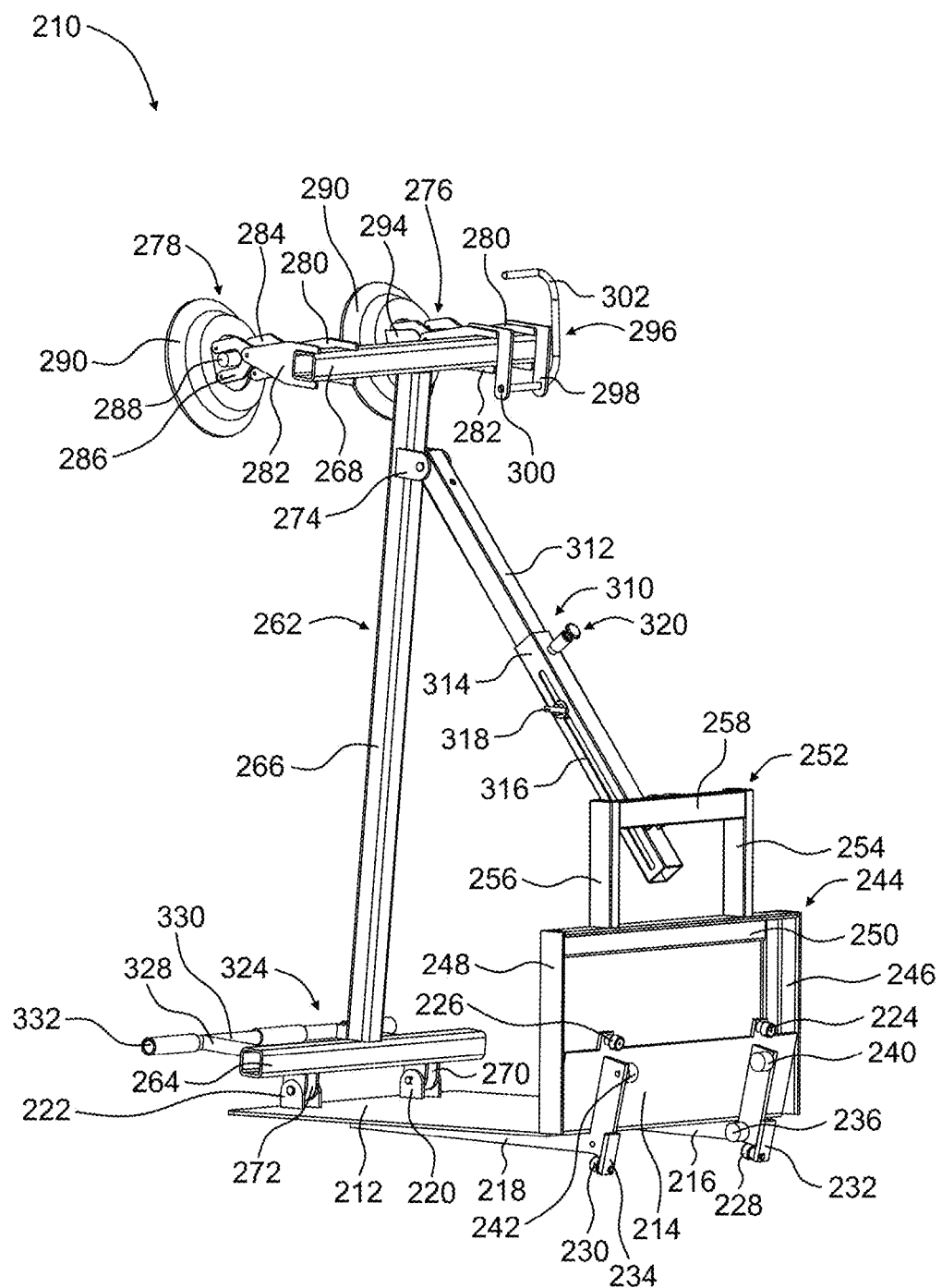
FIG. 20 is a rear perspective view of the glass adjustment system of FIG. 19, in accordance with an aspect of the present invention.

The glass support member 262 may also include a first suction cup assembly 276 coupled to a first side of the top support member 268 and a second suction cup assembly 278 coupled to a second side of the top support member 268. As best seen in FIGS. 12-13, the first and second suction cup assemblies 276, 278 may each include a first brace 280 and a second brace 282 spaced apart from the first brace 280. The first and second braces 280, 282 may each be coupled to the top support member 268 at a first end. The first and second suction cup assemblies 276, 278 may also include a first arm 284 rotatably coupled to the first brace 280 at a second end and a second arm 286 rotatably coupled to the second brace 282 at a second end. The first and second suction cup assemblies 276, 278 may each include a securement member 290, for example, a suction cup member or the like to secure the glass to the apparatus 100. The securement member 290 may include a first coupling plate 292 and a second coupling plate 294 secured to a back side of the securement member 290. The first coupling plate 292 may be spaced apart from the second coupling plate 294. The first and second suction cup assemblies 276, 278 may also include a pin 288 secured to the second coupling plate 294 and extending through a portion of the first coupling plate 292. The portion of the pin 288 extending out of the first coupling plate 292 may, for example, engage the cavities in the first arms 284 of the first and second suction cup assemblies 276, 278.

The glass support member 262 of the system 210 may also include a handle assembly 296, as shown in FIGS. 13 and 19-21. The handle assembly 296 may include a first handle brace 298, a second handle brace 300 spaced apart from the first handle brace 298, and a handle 302 engaging the first and second handle braces 298, 300. The first handle brace 298 may be positioned over a first end of the top support member 268 and coupled to the first brace 280. The second handle brace 300 may be positioned over the top support member 268 near the first end and coupled to the second brace 282. The handle 302 may be used to position the glass support member 262 and the glass attached to thereto.

With continued reference to FIGS. 1-3, 12-13, and 19-22, the system 210 may also include a glass holder slide assembly 310. The glass holder slide assembly 310 may be rotatably secured to the glass support member 262 with the coupling member 274. The glass holder slide assembly 310 may include a first tube 312 and a second tube 314. The first and second tubes 312, 314 may telescopically engage each other to allow for adjustment during use. The first or inner tube 312 may include an opening (not shown) at the first end for being rotatably secured to the coupling member 274 and a plurality of holes (not shown) near the second end. The second or outer tube 314 may include a channel 316 extending through the second tube 314 and along the length of the second tube 314. The channel 316 may be sized and shaped to receive a friction adjuster 318, which extends through the channel 316 to assist with adjustment of the glass support member 262. The second tube 314 may also include a pin assembly 320 positioned on a side of the second tube 314 near a first end. The pin assembly 320 may include a housing, a pin detent and a knob for extending into the second tube 314 at, for example, a position perpendicular to the channel 316, to engage and secure the first tube 312 in the desired position. The second tube 314 may also include a pivot member 322 coupled near the second end of the second tube 314. The pivot member 322 may be hingedly or rotatably coupled to the upper coupling member 260 of the lower tray back support 244 to allow for rotation when the glass holder slide assembly 310 is adjusted. The glass holder slide assembly 310 may also include a push bar (not shown) coupled to the first tube 312 to assist with raising and lowering the slide assembly 310 when titling the glass.

The glass adjustment system 210 may also include a bottom glass support member 324, as shown in FIGS. 1-3, 8, 9, 19, 20 and 22. The bottom support member 324 may include a first arm 326, a second arm 328 spaced apart from the first arm 326, and a support member 330 coupled to the first and second arms 326, 328. The first arm 326 may be coupled to the base member 264 at a first end and the support member 330 at a second end. The second arm 328 may be coupled to the base member 264 at a first end and the support member 330 at a second end. The support member 330 may be positioned perpendicular to the first and second arms 326, 328 and generally parallel to the base member 264. The bottom support member 324 may also include at least one deformable cover 332 positioned over the support member 330 to provide additional support and cushion for the panel that is coupled to the adjustment system 210.

A method of using the apparatus 100 to install ice rink glass may include, for example, obtaining and positioning the desired glass panel in an installation position. The apparatus 100 may then be positioned so that the securement members 290 are facing the glass panel. Next, the securement members 290 may be coupled to the glass panel. Once coupled the glass panel may be raised into the air using the winch mechanism 190 to a height which will avoid contact with any floor obstacles that may contact the glass and break the glass. Then, if necessary, the glass panel may be tilted back using the glass holder slide assembly 310 until a desired angle is achieved. The angle of the glass panel may be, for example, between 0° and 30° as needed to clear any low ceilings, pipes, heaters, or other obstacles between the glass storage area and the location for the glass installation. After the glass panel is positioned to avoid contacting any obstacles, the apparatus 100 may be moved to the installation site. When the apparatus 100 reaches the installation site, if the holder slide assembly 310 is titled at an angle, then the holder slide assembly 310 may be adjusted back to 0° for installation. Next, the glass panel may be raised using the winch 190 to the desired position for installation. For example, if replacing ice rink glass, then the winch 190 may be turned to raise the piece of glass above the ice rink boards. Once the desired height of the glass panel is achieved, the apparatus 100 may be moved to position the glass panel into, for example, a channel of the boards. Then, the glass panel may be positioned in the channel by turning the winch 190 to lower the glass panel into the channel. When the glass panel reaches its desired position, the glass panel may then be secured into the channel of the ice rink boards. Finally, the securement members 290 may be released from the glass panel and any additional securement of the glass panel to the channel may be completed.

Another method of using the apparatus 100 is to remove ice rink glass for, for example, repairs, may include, for example, obtaining and positioning the apparatus 100 in front of the piece of glass to be removed. The repairs may include, for example, repairs to the rubber gasket on the glass, replacing the clips which secure the glass to the boards, replacing the securement pieces between the ice rink boards and glass, and the like. Once the apparatus 100 is positioned in front of the glass panel, the securement members 290 may be attached to the glass panel. Next, the clips, screws, nuts, and the like which secure the glass panel in place may be removed. The winch 190 may then be turned to raise the height of the glass panel out of the ice rink board channels. When the glass panel clears the boards and channels, then the apparatus 100 may be moved away from the boards and the repairs may be performed. If necessary, the winch 190 may be used to lower the glass panel to make any necessary repairs to the glass panel, then the glass panel may be raised again by the winch 190 to the necessary installation position. After the repairs are complete, the apparatus 100 may be moved back to position the glass panel above the channels and boards. Once in the correct position, the winch 190 may be turned to lower the glass panel back into the boards and channels. When the glass panel reaches the final position, the glass panel may again be secured to the boards. Finally, the securement members 290 may be released from the glass panel and any additional securement of the glass panel to the channel may be completed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The invention has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

The invention claimed is:
1. An apparatus, comprising:
a base portion;
a back support structure secured to the base portion; and
a glass adjustment system moveably coupled to the back support structure, wherein the glass adjustment system comprises:

a tray with a back portion;
a first tray support arm engaging a portion of the tray and the back portion near a first side, wherein the first tray support arm includes at least one guide wheel positioned to engage a first leg of the back support structure;
a second tray support arm engaging a portion of the tray and the back portion near a second side, wherein the second tray support arm includes at least one guide wheel positioned to engage a second leg of the back support structure;
a lower tray back support coupled to at least one of the tray and the back portion;
an upper tray back support coupled to a top of the lower tray back support;
a glass support member pivotally coupled to the tray;
a glass holder slide assembly coupled to a vertical member of the glass support member at a first end and coupled to the upper tray back support near a second end; and
a bottom glass support member coupled to a base member of the glass support member.

2. The apparatus of claim 1, wherein the glass support member comprises:
the base member;
a top support member;
the vertical member coupled to a center portion of the base member at a first end and a center portion of the top support member at a second end;
a first suction cup assembly coupled to a first end of the top support member;
a second suction cup assembly coupled to a second end of the top support member; and
a handle assembly coupled to the first end of the top support member.

3. The apparatus of claim 2, wherein the at least one guide wheel of the first tray support arm comprises:
a first guide wheel positioned at a top end of the first tray support arm;
a second guide wheel positioned at a bottom end of the first tray support arm; and
wherein the first guide wheel is vertically offset from the second guide wheel; and
wherein the at least one guide wheel of the second tray support arm comprises:
a first guide wheel positioned at a top end of the second tray support arm;
a second guide wheel positioned at a bottom end of the first tray support arm; and
wherein the first guide wheel is vertically offset from the second guide wheel.

4. The apparatus of claim 3, wherein the first suction cup assembly comprises:
a first brace coupled to the top support member near a first end;
a first arm rotatably coupled to the first brace;
a second brace coupled to the top support member near the first end and spaced apart from the first brace;
a second arm rotatably coupled to the second brace; and
a first securement member with a first coupling plate, a second coupling plate positioned spaced apart from the first coupling plate, and a pin secured to the first coupling plate on a first end and the second coupling plate on a second end, the first coupling plate secured to the first arm and the second coupling plate secured to the second arm;
wherein the second suction cup assembly comprises:
a first brace coupled to the top support member near a second end;
a first arm rotatably coupled to the first brace;
a second brace coupled to the top support member near the second end and spaced apart from the first brace;
a second arm rotatably coupled to the second brace; and
a second securement member with a first coupling plate, a second coupling plate positioned spaced apart from the first coupling plate, and a pin secured to the first coupling plate on a first end and the second coupling plate on a second end, the first coupling plate secured to the first arm and the second coupling plate secured to the second arm; and
wherein the handle assembly comprises:
a first handle brace coupled to the top support member;
a second handle brace coupled to the top support member and spaced apart from the first handle brace; and
a handle engaging the first handle brace and the second handle brace.

5. The apparatus of claim 4, wherein the glass holder slide assembly comprises:
a first tube; and
a second tube that telescopically engages the first tube.

6. The apparatus of claim 5, wherein the first tube comprises:
an opening at a first end for rotatably coupling with the vertical member of the glass support member; and
a plurality of holes positioned along a longitudinal axis near a second end of the first tube.

7. The apparatus of claim 6, wherein the second tube comprises:
a channel extending through the second tube and extending along a portion of a longitudinal axis of the second tube;
a pin assembly positioned near a first end of the second tube and extending into the second tube to engage at least one hole of the plurality of holes in the first tube; and
a pivot member coupled near a second end of the second tube and coupled to the upper tray back support.

8. The apparatus of claim 7, wherein the glass holder slide assembly further comprises:
a friction adjuster extending through the channel of the second tube.

9. The apparatus of claim 8, wherein the bottom glass support member comprises:
a first arm coupled at a first end to the base member of the glass support member;
a second arm coupled at the first end to the base member of the glass support member;
a support member coupled to a second end of the first arm and to a second end of the second arm; and
at least one deformable cover positioned around at least a portion of the support member.

10. The apparatus of claim 9, wherein the base portion comprises:
a frame;
a first plate coupled to a top surface of the frame in a first corner;
a second plate coupled to a top surface of the frame in a second corner;
a first wheel assembly coupled to a bottom surface of the first plate;
a second wheel assembly coupled to a bottom surface of the second plate;

a first rear wheel coupled to the frame by a first axle; and
a second rear wheel coupled to the frame by a second axle.

11. The apparatus of claim 10, wherein the frame comprises:
a first support member;
a second support member;
a third support member; and
a fourth support member, wherein the first support member is secured at a first end to a first end the second support member and at a second end to a first end of the third support member and the fourth support member is secured at a first end to a second end of the second support member and at a second end to a second end of the third support member.

12. The apparatus of claim 11, wherein the frame further comprises:
a first arm coupled to the fourth support member near the first end; and
a second arm coupled to the fourth support member near the second end.

13. The apparatus of claim 12, wherein the base portion further comprises:
a first bracket coupled to a top surface of the first support member above the first axle;
a second bracket coupled to the top surface of the first support member above the second axle; and
a counter weight secured to the first bracket at a first end and to the second bracket at a second end.

14. The apparatus of claim 13, wherein the back support structure comprises:
a base, wherein the base comprises:
a brace member secured to the first arm of the frame at a first end and the second arm of the frame at a second end; and
a first support arm with a first end and a second end, the first end coupled to a first end of the brace member; and
a second support arm with a first end and a second end, the first end coupled to a second end of the brace member;
a first leg with a top end and a bottom end, the bottom end coupled to the second end of the first support arm;
a second leg with a top end and a bottom end, the bottom end coupled to the second end of the second support arm;
a crossbar secured to the top end of the first leg at a first end and to the top end of the second leg at a second end;
a first angled support with a first end and a second end, the first end secured to the first support arm and the second end coupled to the first leg; and
a second angled support with a first end and a second end, the first end secured to the second support arm and the second end coupled to the second leg.

15. The apparatus of claim 14, wherein the back support structure further comprises:
a rear support member with a front side and a back side, wherein a first portion of the front side is coupled to first leg, a second portion of the front side is coupled to the second leg, and the back side is secured to the first support member of the frame;
a first rod with a first end and a second end, wherein the first end is coupled to the top end of the first leg and the second end is coupled to the back side of the rear support member; and
a second rod with a first end and a second end, wherein the first end is coupled to the top of the second leg and the second end is coupled to the back side of the rear support member.

16. The apparatus of claim 15, wherein the back support structure further comprises:
a winch support member positioned between the first leg and the second leg, wherein the winch support member comprises:
a main plate secured to the first leg and the second leg;
a winch mount extending out relatively perpendicular to the main plate; and
a winch coupled to the winch mount;
an upper handle comprising:
a handle support member coupled to the first leg on a first end and the second leg on a second end; and
a push handle secured to a center portion of the handle support member; and
a pulley assembly secured to the crossbar, wherein the pulley assembly comprises:
a pulley base including a base, a first side coupled to a first end of the base, and a second side coupled to a second end of the base;
a pin extending across the pulley base and through the first side and the second side; and
a rotating member rotatably coupled to the pin between the first side and the second side of the pulley base.

17. The apparatus of claim 16, wherein the winch comprises:
a winch base including a back, a first side secured to one end of the base and a second side secured to a second end of the base;
a spool rotatably coupled to the first side and second side of the winch base; and
a hand crank coupled to the spool for rotating the spool.

18. A method of installing a glass panel, comprising:
obtaining an apparatus, the apparatus comprising:
a base portion;
a back support structure secured to the base portion; and
a glass adjustment system moveably coupled to the back support structure,
wherein the glass adjustment system comprises:
a tray with a back portion;
a first tray support arm engaging a portion of the tray and the back portion near a first side, wherein the first tray support arm includes at least one guide wheel positioned to engage a first leg of the back support structure;
a second tray support arm engaging a portion of the tray and the back portion near a second side, wherein the second tray support arm includes at least one guide wheel positioned to engage a second leg of the back support structure;
a lower tray back support coupled to at least one of the tray and the back portion;
an upper tray back support coupled to a top of the lower tray back support;
a glass support member pivotally coupled to the tray;
a glass holder slide assembly coupled to a vertical member of the glass support member at a first end and coupled to the upper tray back support near a second end; and
a bottom glass support member coupled to a base member of the glass support member;
positioning the apparatus adjacent to the glass panel for installation;

coupling the glass adjustment system to the glass panel;
raising the glass panel into the air using the glass adjustment system;
positioning the apparatus and attached glass panel for insertion into an ice rink board;
inserting the glass panel into the ice rink board; and
removing the glass adjustment system from the glass panel.

19. The method of claim 18, further comprising:
tilting the glass panel to an angle relative to the base portion with the glass adjustment system.

20. A method of removing a glass panel, comprising:
obtaining an apparatus, the apparatus comprising:
  a base portion;
  a back support structure secured to the base portion; and
  a glass adjustment system moveably coupled to the back support structure,
wherein the glass adjustment system comprises:
  a tray with a back portion;
  a first tray support arm engaging a portion of the tray and the back portion near a first side, wherein the first tray support arm includes at least one guide wheel positioned to engage a first leg of the back support structure;
  a second tray support arm engaging a portion of the tray and the back portion near a second side, wherein the second tray support arm includes at least one guide wheel positioned to engage a second leg of the back support structure;
  a lower tray back support coupled to at least one of the tray and the back portion;
  an upper tray back support coupled to a top of the lower tray back support;
  a glass support member pivotally coupled to the tray;
  a glass holder slide assembly coupled to a vertical member of the glass support member at a first end and coupled to the upper tray back support near a second end; and
  a bottom glass support member coupled to a base member of the glass support member;
positioning the apparatus adjacent to the glass panel for removal;
coupling the glass adjustment system to the glass panel;
raising the glass panel out of an ice rink board using the glass adjustment system;
moving the apparatus and attached glass panel away from the ice rink board;
performing maintenance to at least one of the glass panel and the ice rink board; and
reinserting the glass panel into the ice rink board.

* * * * *